(12) United States Patent
Yokota

(10) Patent No.: US 7,405,383 B2
(45) Date of Patent: Jul. 29, 2008

(54) OPTICAL PICKUP DEVICE HAVING THREE LIGHT SOURCES WITH A HOLOGRAPHIC ELEMENT FOR DIRECTING DIFFRACTION LIGHT TO PHOTODETECTORS

(75) Inventor: Taizoh Yokota, Higashihiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 34 days.

(21) Appl. No.: 11/704,305

(22) Filed: Feb. 9, 2007

(65) Prior Publication Data
US 2007/0195659 A1    Aug. 23, 2007

(30) Foreign Application Priority Data
Feb. 17, 2006 (JP) .............................. 2006-040356

(51) Int. Cl.
*G02B 7/04* (2006.01)

(52) U.S. Cl. ................... 250/201.5; 250/201.2

(58) Field of Classification Search ............ 250/201.5, 250/201.2, 216, 235; 359/566–569; 369/44.12–44.14, 369/44.23, 44.37, 44.42, 112.09, 112.14
See application file for complete search history.

(56) References Cited

U.S. PATENT DOCUMENTS
7,342,868 B2 *  3/2008  Park et al. .............. 369/112.09

FOREIGN PATENT DOCUMENTS
JP    2001-256667    9/2001
JP    2003-203378    7/2003

* cited by examiner

*Primary Examiner*—Que T Le
(74) *Attorney, Agent, or Firm*—Morrison & Foerster LLP

(57) ABSTRACT

An optical pickup device has three different light sources, a holographic element, beam splitters, and first and second photodetectors. The beam splitters each change an optical path of a light beam coming from the associated light source toward a recording medium and match an optical axis of the changed optical path with an optical axis passing through the holographic element and the first photodetector. Reflected light from the recording medium is divided into zero-order diffraction light and first-order diffraction light by the holographic element. The first photodetector receives the zero-order diffraction light and obtains an RF signal and a tracking error signal. The second photodetector receives the first-order diffraction light and obtains a focusing error signal.

14 Claims, 15 Drawing Sheets

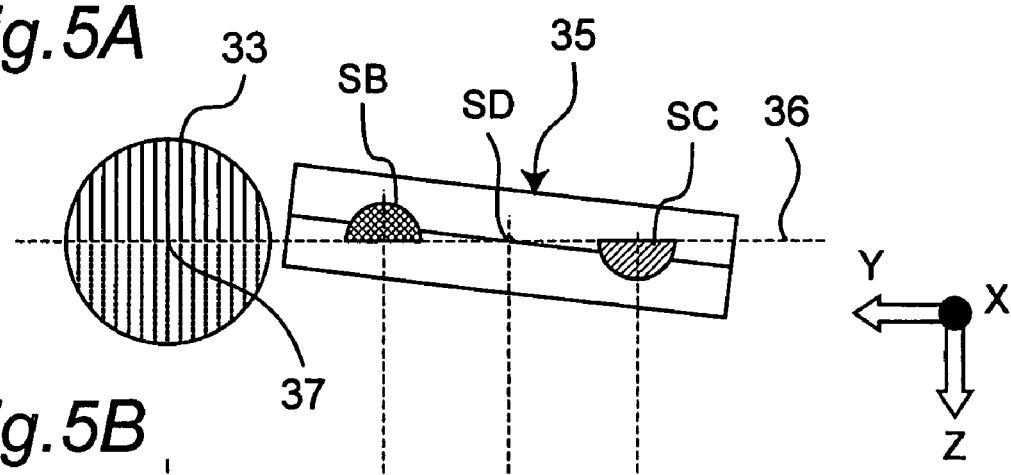
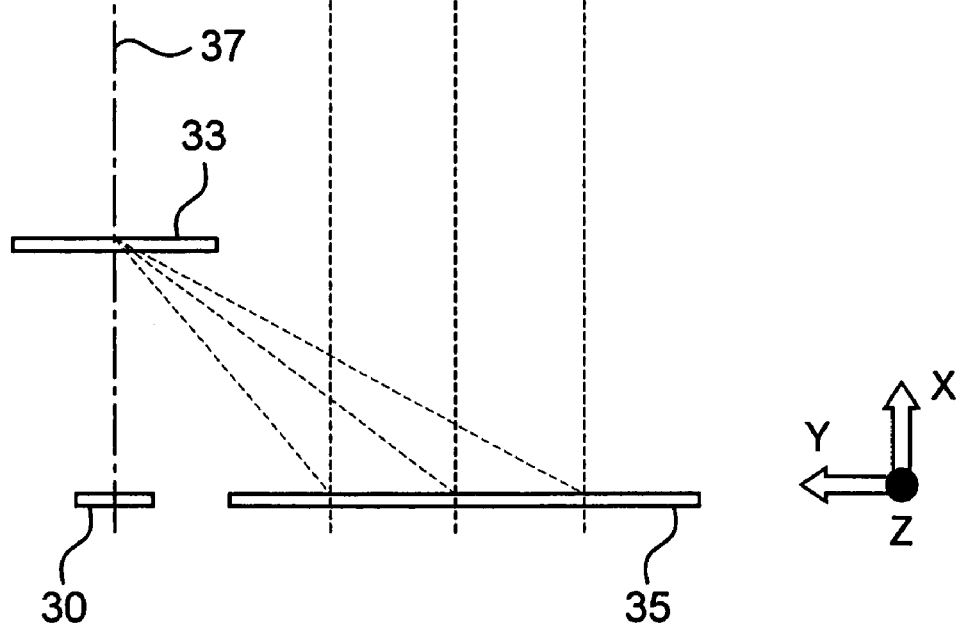

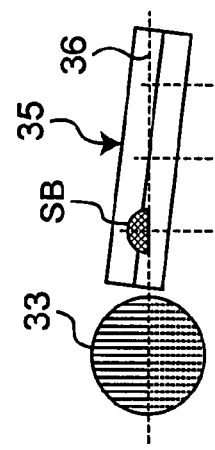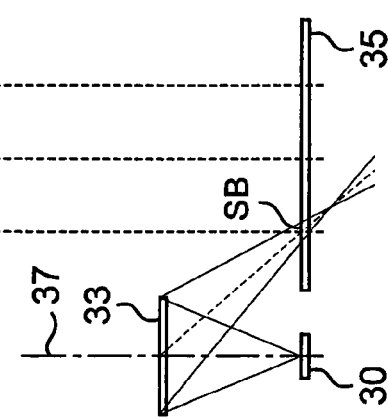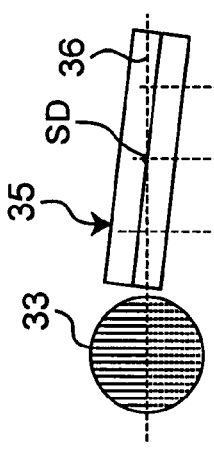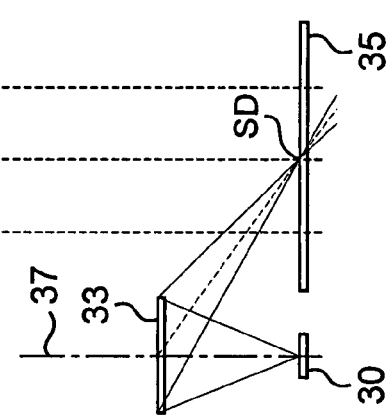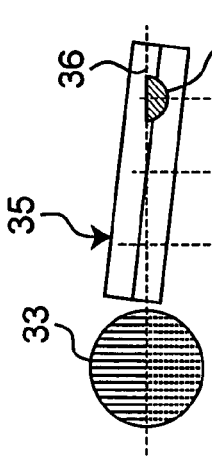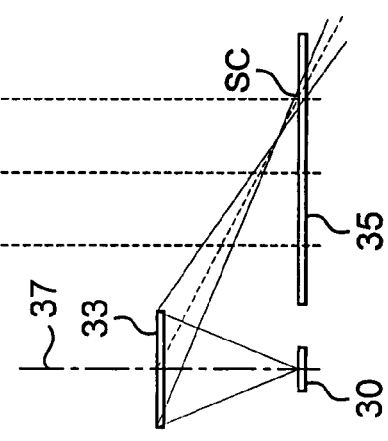

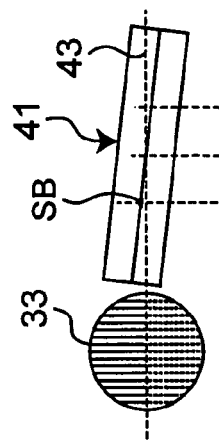
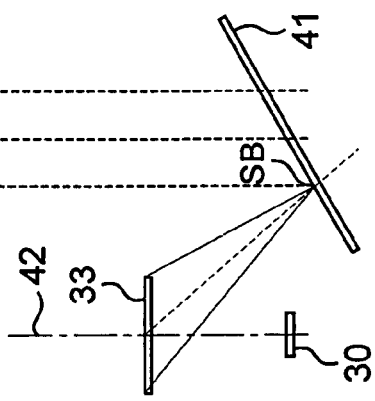
Fig.12A
Fig.12B
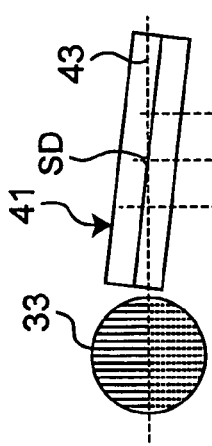
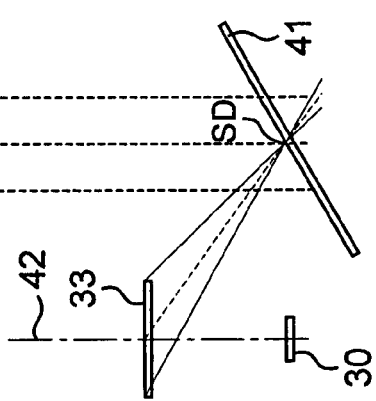
Fig.13A
Fig.13B
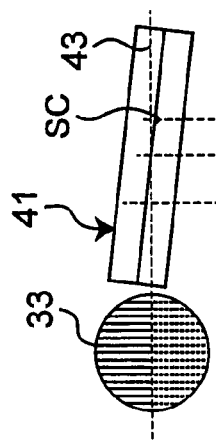
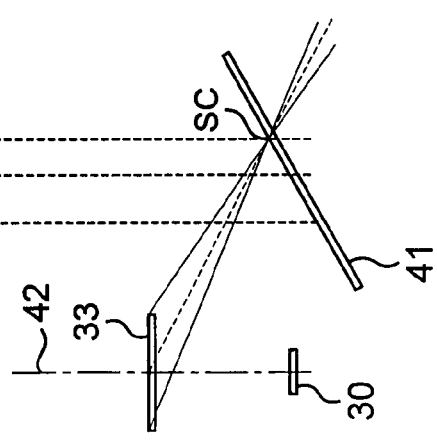
Fig.14A
Fig.14B

OPTICAL PICKUP DEVICE HAVING THREE LIGHT SOURCES WITH A HOLOGRAPHIC ELEMENT FOR DIRECTING DIFFRACTION LIGHT TO PHOTODETECTORS

This nonprovisional application claims priority under 35 U.S.C. §119(a) on Patent Application No(s). 2006-040356 in Japan on Feb. 17, 2006, the entire contents of which are hereby incorporated by reference.

BACKGROUND OF THE INVENTION

The present invention relates to an optical pickup device which has a plurality of light sources for outputting light of different wavelengths to optically record and replay information on disc-shaped recording media having different specifications.

As an optical disc from which signals are optically read using a light beam such as a laser beam, a compact disc (CD) has become widespread. In response to the need for a capacity larger than a CD, a high density disc (digital versatile disc (DVD)) which has been standardized for the purpose of achieving a larger capacity by enabling a recording density higher than a CD in addition to having the same diameter as a CD to keep mechanical compatibility, and a Blue-ray disc (BD) and a high definition (HD)-DVD for which a blue laser is used with the aim of a recording density higher than a DVD have been proposed. Signals recorded on such a high density disc are read by an optical pickup device having an optical system the resolution of which is made high using a semiconductor laser of a wavelength shorter than a normal wavelength.

By the way, there is a following method of allowing an optical pickup device to read signals on both of a CD and a high density disc. That is, an optical pickup device having three kinds of light sources of different wavelengths which are a laser diode for emitting a light beam suitable for a normal density recording medium, a laser diode for emitting a light beam suitable for a high density recording medium, and a laser diode for emitting a light beam suitable for a higher density recording medium are provided, and the light sources are switched according to the recording density of a recording medium from which signals are read, and thus signals on three kinds of recording media having different recording densities are read by this single optical pickup device (see, for example, JP 2001-256667A and JP 2003-203378A).

FIG. 25 shows an example of a conventional pickup device. This optical pickup device having three kinds of light sources for CD/DVD/BD use is provided with optical components, photodetectors, and signal detecting methods corresponding to the wavelengths of the light sources, to say nothing of the three kinds of light sources. In FIG. 25, the reference numeral 1 denotes a light source for BD use, 2 denotes a light source for CD use, 3 denotes a light source for DVD use, 4 denotes a beam splitter (BS) for splitting a light beam for BD use, 5 denotes a BS for splitting a light beam for CD use, 6 denotes a BS for splitting a light beam for DVD use, 7 denotes a collimating lens for CD/DVD use, 8 denotes a prism for BD use, 9 denotes a special collimating lens for BD use capable of correcting spherical aberration, and 10 denotes a prism for synthesis. Furthermore, a light receiving system 11 to 14 for CD/DVD use and a light receiving system 15 to 18 for BD use are disposed separately. The reference numeral 19 denotes an erecting mirror for erecting a light beam toward a disc (not shown).

Other optical pickup devices include an optical pickup device in which two optical pickups which are a first optical pickup corresponding to two wavelengths for CD and DVD use and a second optical pickup corresponding to a wavelength for BD use are mounted on a drive unit.

The aforementioned conventional optical pickup devices for CD/DVD/BD use have the following problems.

That is, there is a problem that the optical pickup device having the three kinds of light sources is required to be provided with optical components, photodetectors, and signal detecting methods corresponding to the wavelengths of the light sources, to say nothing of the three kinds of light sources, so that the optical system and circuit of the optical pickup device become complicated, thereby causing increase in cost and deterioration in reliability.

Furthermore, the optical pickup device in which the first optical pickup for CD/DVD use and the second optical pickup for BD use are mounted on the drive unit also has a problem that the cost and the device size increase because of the two optical pickups.

SUMMARY OF THE INVENTION

It is therefore an object of the present invention to provide an optical pickup device which has a simple structure and high reliability at low cost, and which uses three kinds of light sources of different wavelengths to write and read signals to and from disc-shaped recording media having different recording densities.

An optical pickup device, according to an aspect of the present invention, for writing and reading signals to and from disc-shaped recording media having different recording densities comprises:

first, second, and third light sources for emitting light beams of different wavelengths, wherein, of those different wavelengths, the wavelength of the light beam of the first light source is shortest and the wavelength of the light beam of the third light source is longest;

a holographic element for dividing incoming light into zero-order diffraction light and first-order diffraction light;

a first photodetector for receiving the zero-order diffraction light from the holographic element to obtain an RF signal and a tracking error signal;

a beam splitter for changing an optical path of a light beam coming from the first light source, the second light source or the third light source toward a recording medium and matching an optical axis of the changed optical path with an optical axis passing through the holographic element and the first photodetector, while directing reflected light from the recording medium to the holographic element; and a second photodetector for receiving the first-order diffraction light from the holographic element to obtain a focusing error signal.

According to the above configuration, the beam splitter changes the optical path of a light beam from each of the first light source, the second light source, and the third light source toward a recording medium loaded, and matches the optical axis of the changed optical path to the optical axis passing through the holographic element and the first photodetector, while directing reflected light from the recording medium to the holographic element. The holographic element divides reflected light from the recording medium into zero-order diffraction light and first-order diffraction light. Consequently, for all of the light beams from the three light sources, the single first photodetector is able to receive the zero-order diffraction light and obtain the RF signal and tracking error signal. Furthermore, for all of the light beams from the three light sources, the single second photodetector is able to receive the first-order diffraction light and obtain the focusing error signal.

In other words, optical signals of three kinds of wavelengths can be obtained by the same photodetector without using any special axis-matching element for matching the optical axes of light beams from the three light sources to each other such as a prism for synthesis. Thus, in the present invention, only one light-receiving system comprising a diffraction element base, a holographic element, a light-receiving unit package, a first photodetector, a second photodetector, etc. is used, so that downsizing and cost reduction can be achieved simultaneously.

In one embodiment, the holographic element has a hologram pattern that is set with a wavelength intermediate between the wavelength of the first light source and the wavelength of the third light source.

According to this embodiment, when the wavelength of the second light source is a wavelength substantially intermediate between the wavelength of the first light source and the wavelength of the third light source, the wavelength of the second light source is close to the set wavelength of the hologram pattern. For this reason, the light spot of a light beam from the first light source formed on the second photodetector and the light spot of a light beam from the third light source formed on the second photodetector are almost equally deviated from the position of the light spot of a light beam from the second light source. Consequently, the second photodetector is able to meet light spots for the shortest and longest wavelengths even with a small area as compared with a photodetector in which the positional deviations in light spots of light beams from the first light source and the third light source are unequal. And, good focusing error signals are achievable by Foucault method for holograms.

In one embodiment, the second photodetector is a two-element photodetector, and a parting line of the second photodetector is inclined at a predetermined angle relative to a plane which includes the optical axis and passes through a center of the second photodetector such that a differential output of the second photodetector is made "0" when the light beam from the first light source, the second light source, or the third light source is focused on the recording medium.

According to this embodiment, a light spot of a light beam from the first light source and a light spot of a light beam from the third light source, which spots are formed on the second photodetector under the condition that the light beam is focused on a loaded recording medium, have almost equal defocusing components. The defocusing components can be canceled by inclining the parting line of the second photodetector at a predetermined angle with respect to the plane which includes the optical axis and passes through the center of the second photodetector. As a result, good focusing error signals can be obtained in the second photodetector by the Foucault method for holograms.

In one embodiment, the second photodetector is inclined at a predetermined angle different from the above predetermined angle relative to a plane orthogonal to the optical axis with a front face of the second photodetector directed to the holographic element such that the first-order diffraction light from the holographic element of the light beam from the first light source, the second light source, or the third light source is received on the parting line of the second photodetector under a condition that the light beam from the first light source, the second light source, or the third light source is focused on the recording medium.

According to this embodiment, a light spot of a light beam from the first light source and a light spot of a light beam from the third light source, which spots are formed on the second photodetector, have almost equal defocusing components. The defocusing components in the spots of the light beams from the first light source and the third light source can be reduced as far as possible by inclining the second photodetector at the predetermined angle with respect to the plane orthogonal to the optical axis. As a result, the area of the second photodetector can be further reduced, so that focusing error signals can be obtained by the Foucault method for holograms at a high speed of response.

In one embodiment, when a circle having a radius that is equal to a distance between the holographic element and the first photodetector and having a center at the center of the holographic element is drawn such that the circle passes through a center of the first photodetector, the center of the second photodetector is positioned on the circle, and the second photodetector is inclined at a predetermined angle with respect to a plane orthogonal to the optical axis so that a front face of the second photodetector is directed to the holographic element. The predetermined angle is set at an angle of a tangent to the circle at the center of the second photodetector relative to the plane. And, the first-order diffraction light from the holographic element of the light beam from the first light source, the second light source, or the third light source is received on the parting line of the second photodetector with the light beam from the first light source, the second light source, or the third light source focused on the recording medium.

According to this embodiment, defocusing components are almost equally generated in the light spot of a light beam from the first light source and the light spot of a light beam from the third light source which are formed on the second photodetector. The defocusing components in the spots of the light beams from the first light source and the third light source can be reduced as far as possible by the inclination of the second photodetector at the predetermined angle with respect to the plane orthogonal to the optical axis. As a result, the area of the second photodetector can be further reduced, so that focusing error signals can be obtained by the Foucault method at a high speed of response.

In one embodiment of the optical pickup device, the beam splitter for changing an optical path of a light beam coming from the first light source, the second light source, or the third light source toward a recording medium is an integrated prism common to the first light source, the second light source, and the third light source.

According to this embodiment, it is not necessary to dispose three individual beam splitters, which are a beam splitter for the first light source, a beam splitter for the second light source, and a beam splitter for the third light source, on the optical axis. Because of this, it becomes easy to assemble the optical components, thereby obtaining a compact and low-cost optical pickup device.

In one embodiment, the first light source, the second light source, and the third light source are staggered on opposite sides of the optical axis.

According to this embodiment, the first light source, the second light source, and the third light source are staggered configuration on opposite sides of the optical axis, so that the light sources can be prevented from interfering with each other.

In one embodiment, of the first, second and third light sources, a light source that is nearest to a spindle motor for rotating recording media with respect to a direction of the optical axis is disposed on a side opposite to the spindle motor of the optical axis.

According to this embodiment, the light source which is nearest to the spindle motor with respect to the direction of the optical axis and may mechanically interfere with the recording medium or the spindle motor is disposed on the side opposite to the spindle motor of the optical axis, so that the light source can be prevented from interfering with the recording medium or the spindle motor. Because of this, a low-cost spindle motor having a standard diameter can be adopted and the size of the pickup device can be thus further reduced, thereby reducing the cost.

Furthermore, an optical pickup device, according to another aspect of the present invention, for writing and reading signals to and from disc-shaped recording media having different recording densities comprises:

first, second, and third light sources for emitting light beams of different wavelengths, wherein, of those different wavelengths, the wavelength of the first light source is shortest and the wavelength of the third light source is longest;

a holographic element for dividing incoming light into zero-order diffraction light and first-order diffraction light; a first photodetector for receiving the zero-order diffraction light from the holographic element to obtain an RF signal and a tracking error signal;

a first beam splitter for changing an optical path of a light beam coming from the second light source or the third light source toward a first recording medium and matching an optical axis of the changed optical path with an optical axis passing through the holographic element and the first photodetector, while directing reflected light from the first recording medium to the holographic element;

a second beam splitter for transmitting a light beam from the first light source toward a second recording medium different from the first recording medium, while changing an optical path of reflected light from the second recording medium toward the holographic element and matching an optical axis of the changed optical path with the optical axis passing through the holographic element and the first photodetector to lead the optical axis of the optical path to the holographic element;

a collimating lens for correcting spherical aberration of the light beam from the first light source which has passed through the second beam splitter, while directing reflected light from the second recording medium toward the second beam splitter;

an objective lens for applying the light beam, of which the spherical aberration has been corrected by the collimating lens, to the second recording medium, while directing the reflected light from the second recording medium toward the collimating lens; and a second photodetector for receiving the first-order diffraction light from the holographic element to obtain a focusing error signal.

According to the above configuration, when the second recording medium is a BD which is a special recording medium, the correction of spherical aberration most suitable for the BD can be performed with a collimating lens and objective lens for BD use. In addition, RF signals, tracking error signals, and focusing error signals based on reflected light from the BD can be detected by a photodetector which also detects RF signals, tracking error signals, and focusing error signals based on reflected light from the first recording medium, which may be a DVD or CD, thereby simplifying the detecting circuit.

In other words, a performance increase and cost reduction of the optical pickup device can be achieved.

An optical pickup device, according to still another aspect of the present invention, for writing and reading signals to and from disc-shaped recording media having different recording densities comprises:

first, second, and third light sources for emitting light beams of different wavelengths, wherein, of those different wavelengths, the wavelength of the first light source is shortest and the wavelength of the third light source is longest;

a holographic element for dividing incoming light into zero-order diffraction light and first-order diffraction light;

a first photodetector for receiving the zero-order diffraction light from the holographic element to obtain an RF signal and a tracking error signal;

a first beam splitter for changing an optical path of a light beam coming from the second light source or the third light source toward a recording medium and matching an optical axis of the changed optical path with an optical axis passing through the holographic element and the first photodetector, while directing reflected light from the recording medium to the holographic element;

a second beam splitter for transmitting a light beam from the first light source toward a recording medium, while changing an optical path of reflected light from the recording medium toward the holographic element and matching an optical axis of the changed optical path with the optical axis passing through the holographic element and the first photodetector to lead the optical axis of the optical path to the holographic element;

a collimating lens for correcting spherical aberration of the light beam from the first light source which has passed through the second beam splitter, while directing reflected light from the recording medium toward the second beam splitter;

a synthesis prism for changing the optical path of the light beam of which the spherical aberration has been corrected by the collimating lens, and matching an optical axis of the changed optical path with the optical axis passing through the holographic element and the first photodetector, while splitting the reflected light from the recording medium of the light beam of the first light source to direct part of the reflected light toward the collimating lens; and a second photodetector for receiving the first-order diffraction light from the holographic element to obtain a focusing error signal.

According to the above configuration, when the recording medium is a BD which is a special recording medium, the correction of spherical aberration most suitable for the BD can be performed with a collimating lens and objective lens for BD use. In addition, RF signals, tracking error signals, and focusing error signals based on reflected light from the BD can be detected by a photodetector which also detects RF signals, tracking error signals, and focusing error signals based on reflected light from DVD or CD, thereby simplifying the detecting circuit.

In other words, according to the present invention, a performance increase and cost reduction of the optical pickup device can be achieved.

Furthermore, an optical pickup device, according to a further aspect of the present invention, for writing and reading signals to and from disc-shaped recording media having different recording densities comprises:

first, second, and third light sources for emitting light beams of different wavelengths, wherein, of those different wavelengths, the wavelength of the first light source is shortest and the wavelength of the third light source is longest;

a holographic element for obtaining first-order diffraction light of incoming light; and a photodetector for receiving the first-order diffraction light from the holographic element to obtain an RF signal, a tracking error signal, and a focusing error signal, wherein the holographic element has a hologram pattern that is set with a wavelength intermediate between the wavelength of the first light source and the wavelength of the third light source; and wherein the first light source, the second light source, and the third light source are arranged in such a manner that the light sources are at increasing distances from the photodetector in order of increasing wavelength of the light sources and at increasing distances from the holographic element in a direction in which the optical axis passing through the holographic element and the second light source extend in order of decreasing wavelength of the light sources, with the first light source, the second light source, and the third light source being installed in a single package.

According to the above configuration, the first light source, the second light source, and the third light source are arranged near the photodetector in order of increasing wavelength, so that it becomes possible to cancel the deviations, caused by variations in wavelength, of positions in which the first-order diffraction light spots of light beams from the three light sources are formed on the photodetector. In addition, the first light source, the second light source, and the third light source are arranged near the holographic element in order of decreasing wavelength in the direction in which the optical axis extends ("direction of extension of the optical axis"), so that it becomes possible to cancel the deviations, caused by variations in wavelength, of defocusing conditions in the first-order diffraction light spots on the photodetector of light beams from the three light sources. Thus, first-order diffraction light of light beams from the first light source, the second light source, and the third light source can be received at substantially equal points on the photodetector as spots in the state of being focused with almost no aberration Consequently, the whole of a light-receiving portion including the holographic element and the photodetector can be made small, to say nothing of the photodetector itself, whereby it is possible to increase the reliability and reduce the cost.

In one embodiment, the photodetector has a two-element light-receiving section for detecting the focusing error signal by differential operation. The first-order diffraction light from the holographic element of the light beam of each of the first light source, the second light source, and the third light source falls on the two-element light receiving section in different areas. And, a parting line for the two-element light-receiving section has a length and an inclination with respect to a plane which includes the optical axis and passes through a center of the two-element light-receiving section, the length and inclination of the parting line being set in accordance with possible variations in ambient temperature so that even if the ambient temperature changes, a differential output of the two-element light-receiving section becomes "0" when the light beam from each of the first light source, the second light source, and the third light source is focused on the recording medium.

According to this embodiment, even if the wavelengths of light beams from the first light source, the second light source, and the third light source vary with variations in ambient temperature, temperature compensation most suitable for variations of the wavelengths can be performed. Thus, steady operations with almost no focusing error against variations in ambient temperature can be performed.

In one embodiment, the inclination of the parting line of the two-element light-receiving section is larger in a first area of the two-element light-receiving section in which the first-order diffraction light of the light beam from the first light source falls than in a second area on which the first-order diffraction light of the light beam from the third light source falls.

When the wavelengths of the light beams from the light sources vary with variations in ambient temperature, positions in which the first-order diffraction light falls on the two-element light-receiving section also vary. In this case, the position in which the first-order diffraction light of a light beam from the first light source having a short wavelength falls is displaced by a small amount in the direction of extension of a plane which includes the optical axis and passes through the center of the photodetector, but by a large amount in the direction perpendicular to the plane. According to this embodiment, the inclination of the parting line is larger in the first area than in the second area, so that temperature compensation most suitable for deviations of the wavelengths of the light sources is made possible.

In one embodiment, the length of the parting line of the two-element light-receiving section is set to be longer in the second area than in the first area.

When the wavelengths of light beams from the light sources vary with variations in ambient temperature so that positions in which first-order diffraction light spots are formed in the two-element light-receiving section vary, the position in which the first-order diffraction light spot of a light beam from the third light source of a long wavelength is formed varies for a long distance in the direction of extension of the plane which includes the optical axis and passes through the center of the photodetector. According to this embodiment, the length of the parting line in the second area is set to be longer than the length of the parting line in the first area, so that the first-order diffraction light spots do not extend off the receiving areas, and therefore temperature compensation most suitable for deviations of the wavelengths of the light sources is made possible.

BRIEF DESCRIPTION OF THE DRAWINGS

The present invention will become more fully understood from the detailed description given hereinbelow and the accompanying drawings which are given by way of illustration only, and thus are not intended to limit the present invention, and wherein:

FIGS. 5A and 5B are detail illustrations of FIG. 4, where FIG. 5A is a front view and FIG. 5B is a side view;

FIGS. 6A and 6B show a state of a first-order diffraction light spot as formed of a light beam for BD use having a short wavelength, where FIG. 6A is a front view and FIG. 6B is a side view;

FIGS. 7A and 7B show a state of a first-order diffraction light spot as formed of a light beam for DVD use having an intermediate wavelength, where FIG. 7A is a front view and FIG. 7B is a side view;

FIGS. 8A and 8B show a state of a first-order diffraction light spot as formed of a light beam for CD use having a long wavelength, where FIG. 8A is a front view and FIG. 8B is a side view;

FIG. 11A is a front view and FIG. 11B is a side view;

FIGS. 12A and 12B show a state of a first-order diffraction light spot of a light beam for BD use having a short wavelength, where FIG. 12A is a front view and FIG. 12B is a side view;

FIGS. 13A and 13b show a state of a first-order diffraction light spot, as formed, of a light beam for DVD use having an intermediate wavelength, where FIG. 13A is a front view and FIG. 13B is a side view;

FIGS. 14A and 14b show a state of forming a first-order diffraction light spot, as formed, of a light beam for CD use having a long wavelength, where FIG. 14A is a front view and FIG. 14B is a side view;

DETAILED DESCRIPTION OF THE INVENTION

The present invention will be described in detail below according to the embodiments shown in the figures.

First Embodiment

Figure 1:
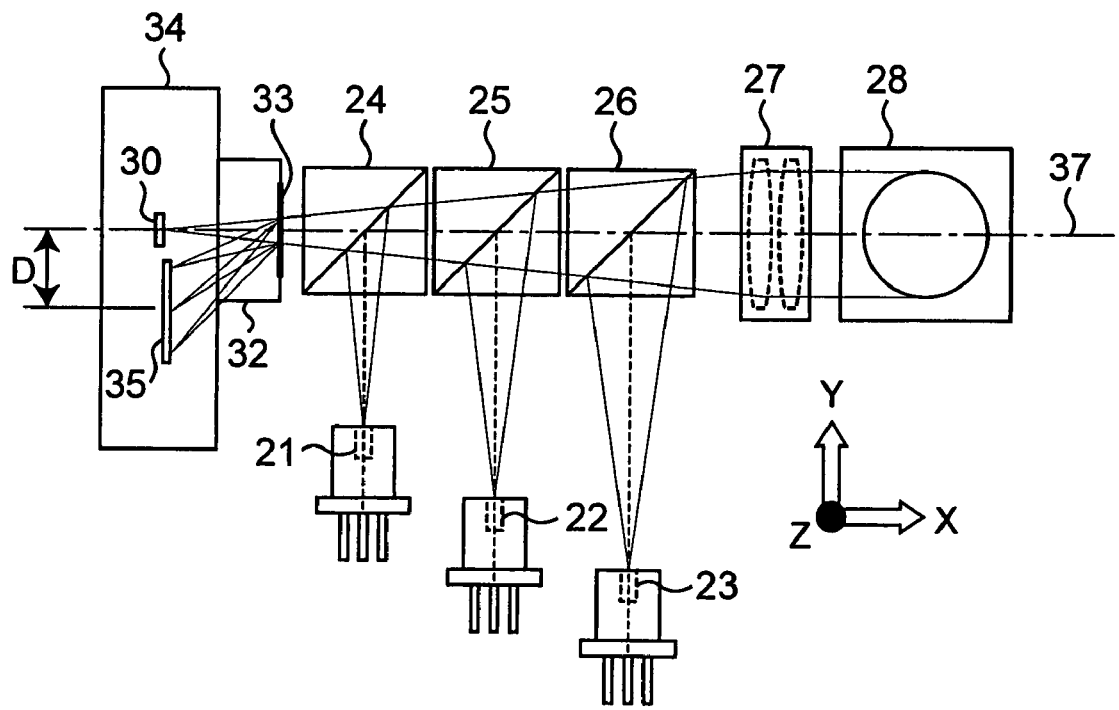
FIG. 1 is a plan view of an optical system of an optical pickup device of a first embodiment of the present invention.
Figure 2:
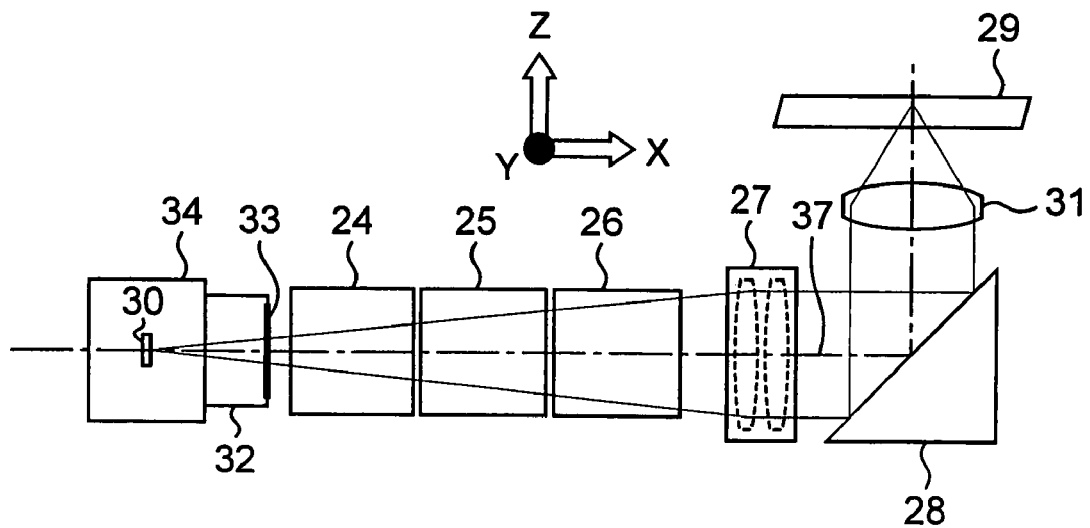
FIG. 2 is a side view of the optical system in FIG. 1.

FIG. 1 is a plan view of an optical system of the optical pickup device of the first embodiment. FIG. 2 is a side view of the optical system shown in FIG. 1. This optical pickup device is so configured that signals can be read from and written to a normal density recording disc such as a CD, a high density recording disc such as a DVD, and an ultra-high density recording disc such as a BD.

In FIG. 1, the reference numeral 21 denotes a light source for BD use, 22 denotes a light source for DVD use, and 23 denotes a light source for CD use. The light sources 21, 22 and 23 are disposed in parallel in such a manner that the optical axes of light beams emitted from the corresponding light sources are changed by corresponding beam splitters 24, 25, and 26, and then the light beams are made substantially parallel beams by a collimating lens 27. After being changed by the beam splitters 24, 25, and 26, the optical axes have been matched with the optical axis 37 passing through a disc 29 and a first photodetector 30 via an erecting mirror 28 for erecting a light beam toward the disc 29. koko The sequence of positions of the light sources 21, 22, and 23 has been set according to polarization characteristics or efficiencies of utilization of light of the beam splitters 24, 25, and 26, which is not discussed here.

A light beam erected by the erecting mirror 28 toward a disc 29 is applied to the disc 29 via an objective lens 31. Reflected light from the disc 29 follows the same route as the applied light and passes through the beam splitters 26, 25, and 24. The reflected light is then converted to transmitted light (zero-order diffraction light) and first-order diffraction light by a holographic element 33 on a diffraction element base 32. The zero-order diffraction light which has passed through the holographic element 33 is received by a first photodetector 30 in a light-receiving unit package 34, while the first-order diffraction light diffracted by the holographic element 33 is received by a second photodetector 35 in the light-receiving unit package 34. The first photodetector 30 and the second photodetector 35 are disposed in such a manner that the light-receiving surfaces of them are parallel to each other.

Figure 3:
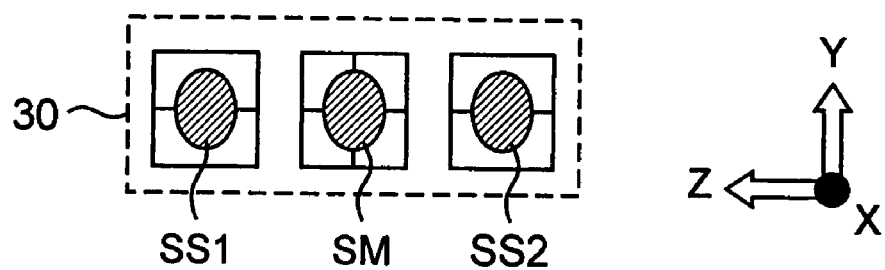
FIG. 3 shows a pattern of light spots formed on the first photodetector in FIGS. 1 and 2.

FIG. 3 shows a pattern of light falling on the first photodetector 30. In FIG. 3, push-pull components of main beams of RF signals and tracking error signals from the disc 29 are obtained from a center spot, while push-pull components of subbeams of tracking error signals are obtained from subspots SS1 and SS2.

Figure 4:
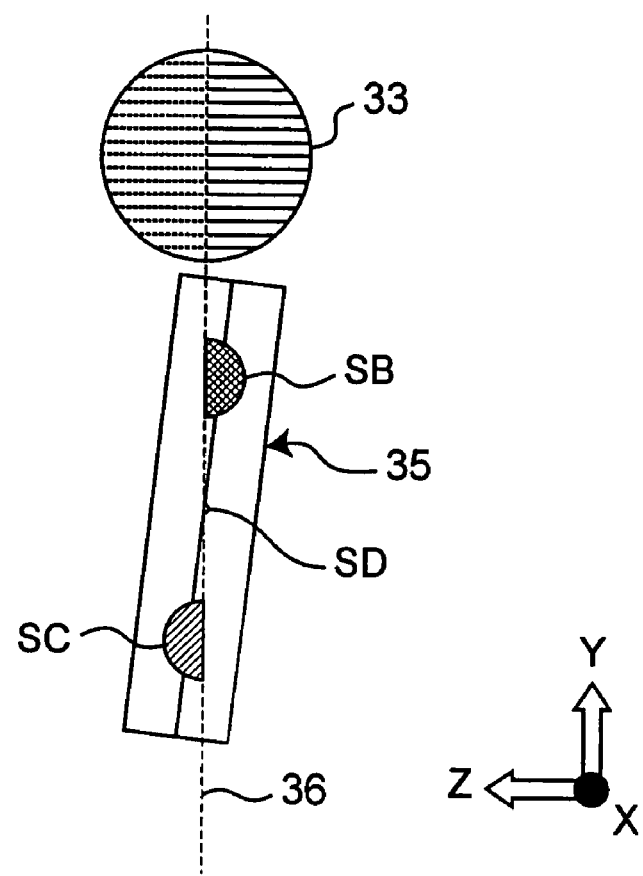
FIG. 4 shows the positional relation between a second photodetector and a holographic element in FIGS. 1 and 2.

FIG. 4 shows the positional relation between the second photodetector 35 and the holographic element 33. In FIG. 4, a spot SB of a light beam for BD use, a spot SD of a light beam for DVD use, and a spot SC of a light beam for CD use are formed on the second photodetector 35, which is a two-element photodetector, in increasing order of distance from the optical axis 37. Focusing error components are detected by performing differential operation with respect to the two split parts of the second photodetector 35 according to the Foucault or knife-edge method.

In this connection, the basic principle of a diffraction element typified by a holographic element is represented by $$\sin \alpha = \lambda/d \quad (1)$$

where $\lambda$ is the wavelength, $\alpha$ is the diffraction angle, and $d$ is the grating pitch. If other conditions are equal, the angle $\alpha$ of refraction due to the holographic diffraction grating of a light beam for CD use having a long wavelength $\lambda$ is larger than that of a light beam for DVD use having a short wavelength. The hologram pattern of the holographic element 33 is set with an intermediate or middle wavelength among the wavelengths of the three kinds of light sources in this embodiment, and the first-order diffraction light spot SD of the light beam for DVD use having a wavelength near the set wavelength of the hologram pattern is formed almost without aberration almost at the center of the second photodetector. In other words, as shown in FIG. 1, the first-order diffraction light spot SD of the light beam for DVD use is formed at a distance "D" from the optical axis 37.

Furthermore, since the hologram pattern is set with the middle wavelength of the three wavelengths of the three light sources, the spot SB of the light beam for BD use having a shorter wavelength than the set wavelength and the spot SC of the light beam for CD use having a longer wavelength than the set wavelength are almost equally deviated from the position of the spot SD of the light beam for DVD use having a wavelength near the set wavelength of the hologram pattern. In this case, the spots SC and SB at both ends are formed with almost equal defocusing components. However, the defocusing components are canceled by inclining the parting line of the second photodetector 35 with respect to the plane 36, which includes the optical axis 37 and passes through the center of the second photodetector 35, to make the differential output of the second photodetector 35 to "0", thereby actually raising no problem. In addition, the increase of area of the second photodetector 35 can be minimized.

FIGS. 5A and 5B-FIGS. 8A and 8B are detailed illustrations of the above diffraction light spots. FIGS. 5A and 5B show more details of FIG. 4, and FIGS. 6A and 6B-FIGS. 8A and 8B show states in which first-order diffraction light spots are formed for each of the wavelengths. FIGS. 5A, 6A, 7A, and 8A are front views of the holographic element 33 and the second photodetector 35 viewed from the holographic element 33 side, and FIGS. 5B, 6B, 7B, and 8B are side views of the holographic element 33, the first photodetector 30, and the second photodetector 35.

In FIGS. 7A and 7B, the hologram pattern of the holographic element 33 is set with the middle wavelength among the wavelengths of the three kinds of light sources, and the first-order diffraction light spot SD of the light beam for DVD use having a wavelength near the set wavelength of the hologram pattern is formed almost at the center of the second photodetector with almost no aberration. FIGS. 6A and 6B show the first-order diffraction light spot of the light beam for BD use having the shortest wavelength, which is shorter than the set wavelength of the hologram pattern, resulting in a relatively large hologram pitch and a relatively small diffraction angle, so that the first-order diffraction light spot SB is formed nearer to the optical axis 37 than the DVD spot SD in a state before focusing. FIGS. 8A and 8B show the first-order diffraction light of the light beam for CD use having the longest wavelength, which is longer than the set wavelength of the hologram pattern, resulting in a relatively small hologram pitch and a relatively large diffraction angle, so that the first-order diffraction light spot SC is formed farther from the optical axis 37 than the DVD spot SD in a state after focusing.

Since the hologram pattern is set with the middle wavelength of the three wavelengths of the three light sources 21 to 23, the spot SC of the light beam for CD use having a longer wavelength than the set wavelength and the spot SB of the light beam for BD use having a shorter wavelength are almost equally deviated from the position of the spot SD of the light beam for DVD use having a wavelength near the set wavelength of the hologram pattern. The spots SB and SC at both ends are formed with almost equal defocusing components included.

As a consequence, in this embodiment, in the state that a light beam emitted from an optical source 21, 22, or 23 is focused on the disk 29, the parting line of the second photodetector 35 is inclined with respect to the plane 36 which includes the optical axis 37 and passes through the center of the second photodetector 35 to make the differential output of the second photodetector 35 to "0". Because of this, the defocusing components can be canceled, thereby actually becoming no problem. In addition, the increase of area of the second photodetector 35 can be minimized.

Figure 25:
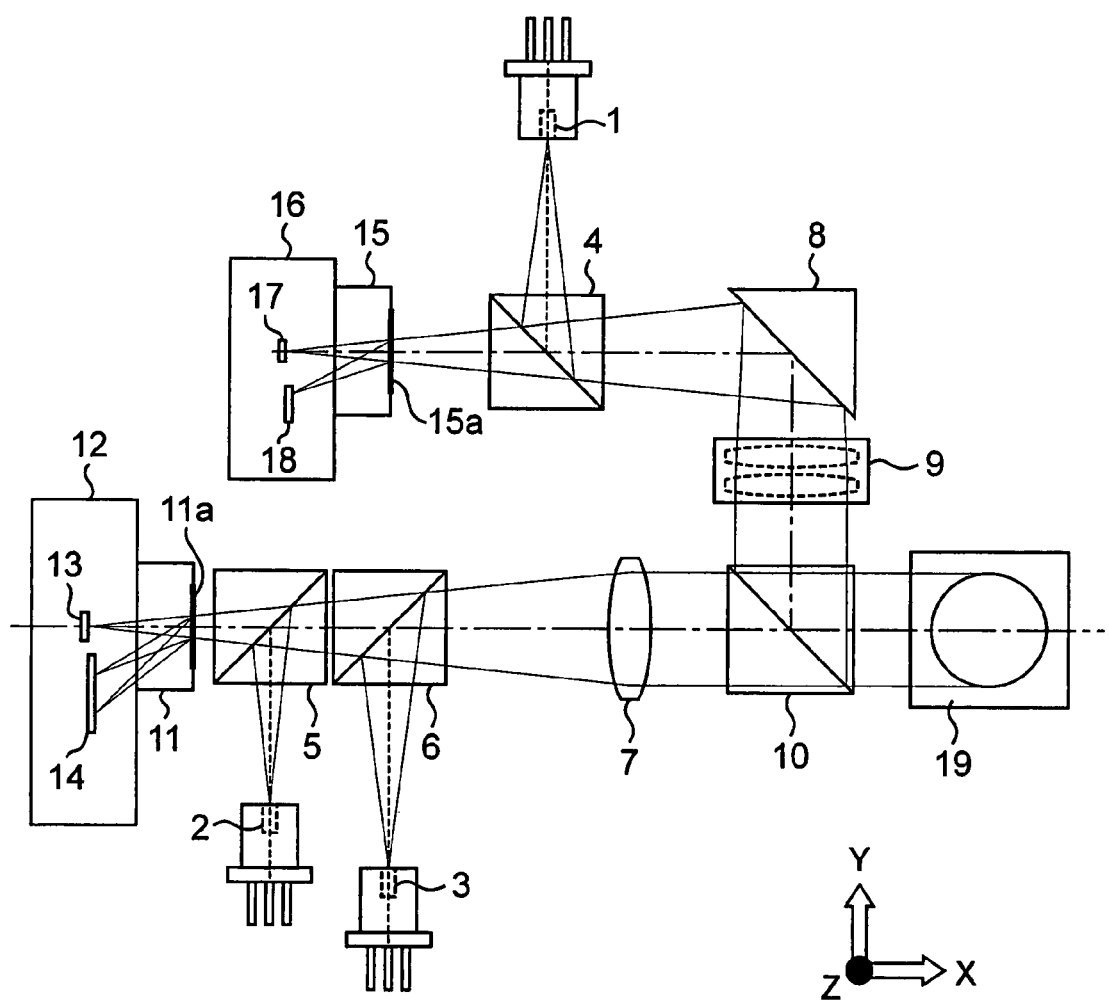
FIG. 25 shows an example of a conventional pickup device.

Furthermore, in this embodiment, the light source for BD use 21, the light source for DVD use 22, and the light source for CD use 23 are arranged in such a manner that after a light beam from the light source 21, 22, or 23 is changed in its optical axis by the corresponding dedicated beam splitter 24, 25, or 26, the changed optical axis is matched with, that is, is made to agree with, the optical axis 37 passing through the disc 29 and the first photodetector 30 via the erecting mirror 28. Due to this arrangement, in the present embodiment, a single collimate lens 27 can be used both as the collimating lens for CD/DVD use 7 and the collimating lens for BD use 9 in conventional optical pickup device shown in FIG. 25, so that the prism for BD use 8, the collimating lens for CD/CVD use 7, the prism for synthesis 10, and the light-receiving system for BD use 15 to 18 in the conventional optical pickup device shown in FIG. 25 are omitted.

In other words, according to this embodiment, one light-receiving system including one first photodetector 30 and one second photodetector 35 is able to meet the wavelengths of the three kinds of light sources 21 to 23, thereby simultaneously achieving downsizing and cost reduction of the optical pickup device.

Second Embodiment

Figure 9:
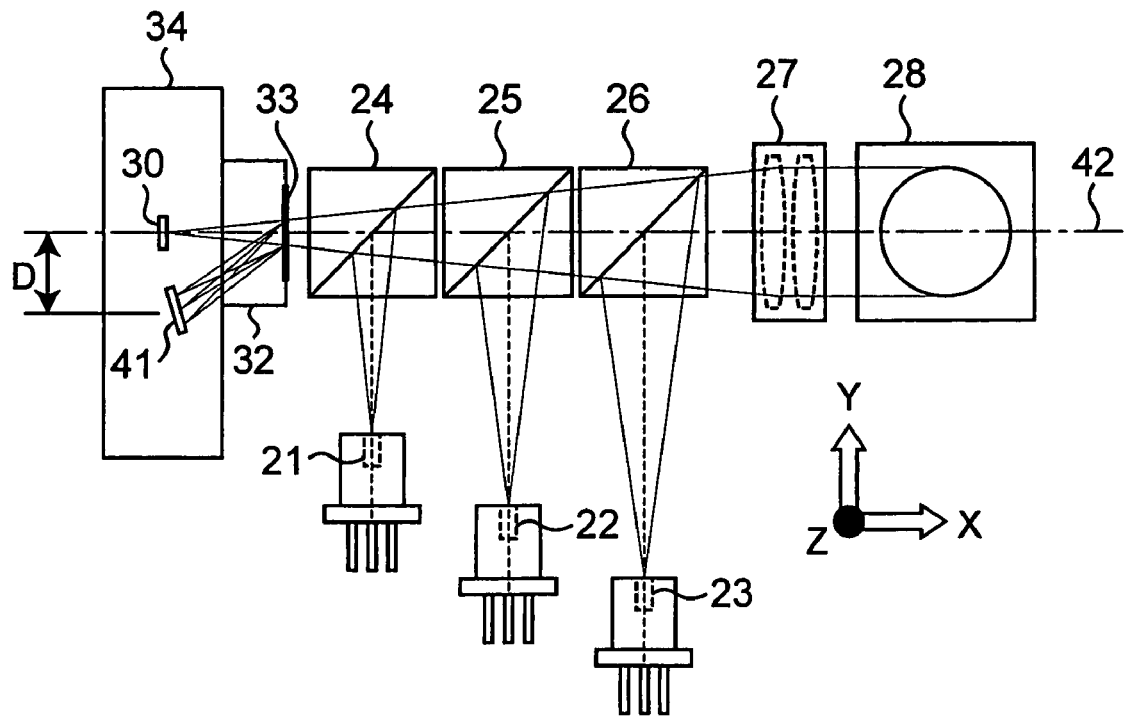
FIG. 9 is a plan view of an optical system of an optical pickup device of a second embodiment of the present invention.
Figure 10:
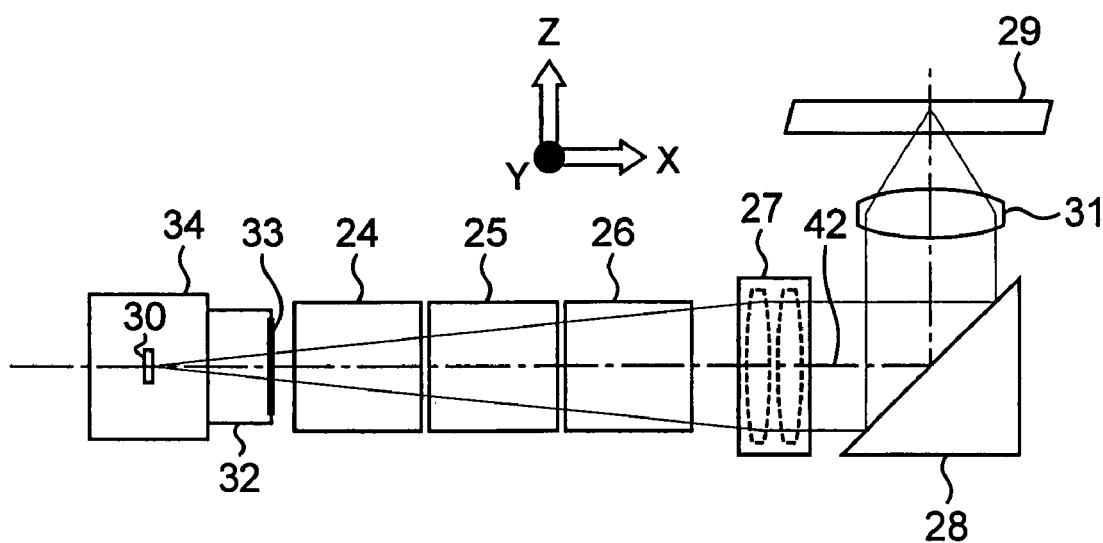
FIG. 10 is a side view of the optical system in FIG. 9.

FIG. 9 is a plan view of an optical system of the optical pickup device of the second embodiment. FIG. 10 is a side view of the optical system shown in FIG. 9. In FIGS. 9 and 10, components same as those in the first embodiment shown in FIGS. 1 and 2 are denoted by the same numerals, and detail descriptions about them are omitted.

In this optical pickup device, the parting line of a second photodetector 41 for focusing-error detection is inclined at a first predetermined angle with respect to a plane 43 that includes an optical axis 42 and passes through the center of the second photodetector 41, and the second photodetector 41 is inclined at a second predetermined angle with respect to a plane orthogonal to the optical axis 42, to make the differential output of the second photodetector 41 to "0".

Figure 11A:
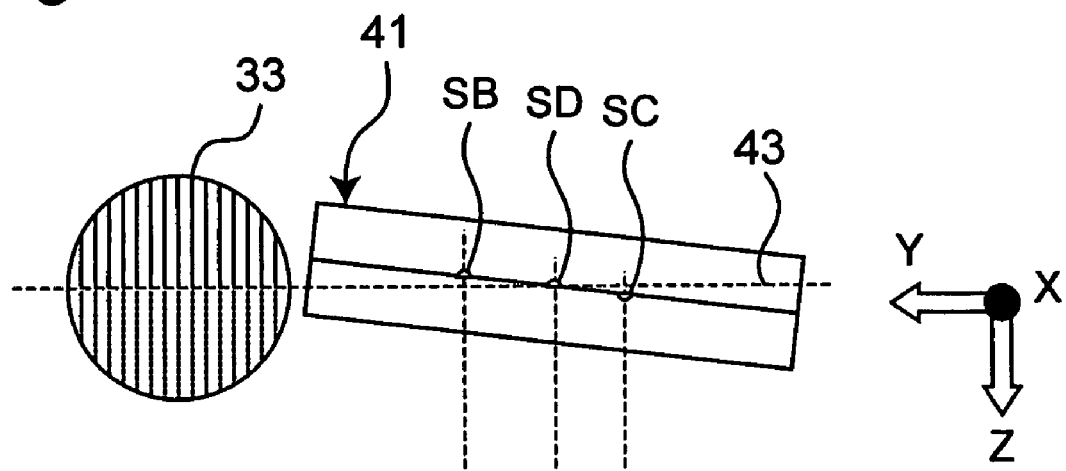
FIGS. 11A and 11B show the positional relation between a second photodetector and a holographic element in FIGS. 9 and 10, where
Figure 11B:
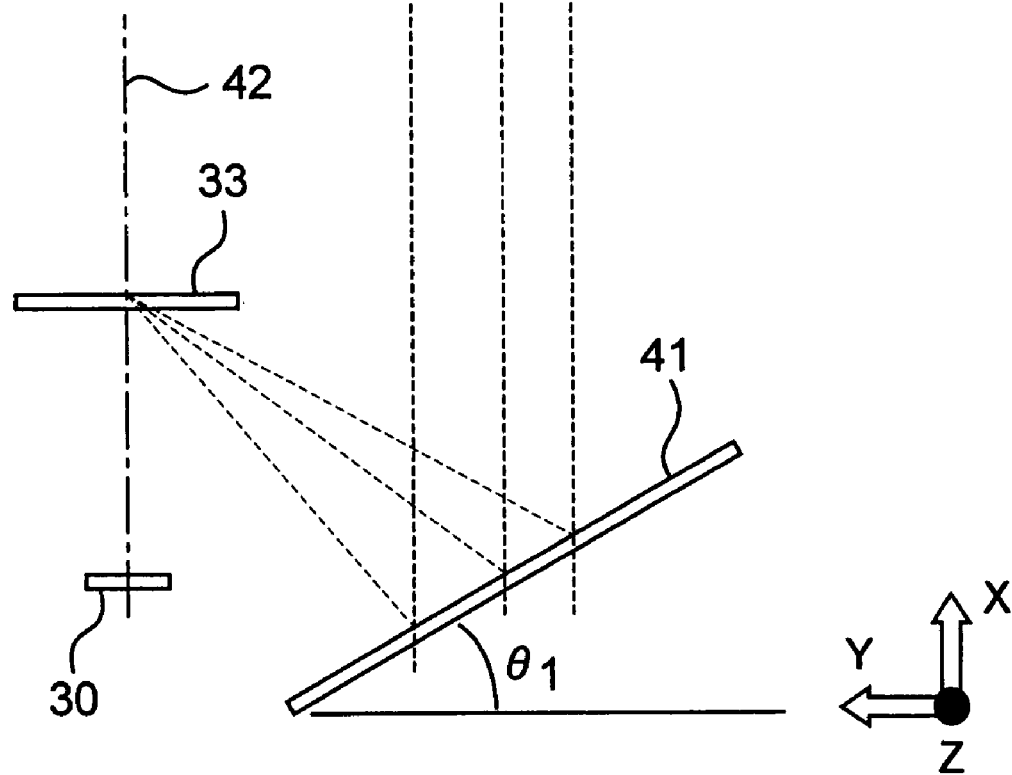

FIG. 11A is a front view of the holographic element 33 and the second photodetector 41 viewed from the holographic element 33 side. FIG. 11B is a side view of the holographic element 33, the first photodetector 30, and the second photodetector 41. As shown in FIG. 11B, the second photodetector 41 is disposed with an inclination of an angle $\theta_1$ with respect to the plane orthogonal to the optical axis 42 so that the front face of the second photodetector 41 is directed to the holographic element 33.

FIGS. 12A and 12B-FIGS. 14A and 14B show states that first-order diffraction light spots are formed for the respective wavelengths. FIGS. 12A, 13A, and 14A are front views of the holographic element 33 and the second photodetector 41 viewed from the holographic element 33 side, and FIGS. 12B, 13B, and 14B are side views of the holographic element 33, the first photodetector 30, and the second photodetector 41.

The hologram pattern of the holographic element 33 is set with a middle wavelength of the wavelengths of the three kinds of light sources 21 to 23, so that the first-order diffraction light spot SC of the light beam for CD use having a longer wavelength than the set wavelength and the first-order diffraction light spot SB of the light beam for BD use having a shorter wavelength are almost equally deviated from the position of the first-order diffraction light spot SD of the light beam for DVD use having a wavelength near the set wavelength of the hologram pattern. The spots SB and SC at both ends are formed with almost equal defocusing components included.

As a consequence, in this embodiment, in the state that a light beam emitted from an optical source 21, 22, or 23 is focused on the disk 29, the parting line of the second photodetector 41 is inclined at the first predetermined angle with respect to the first plane 43 that includes the optical axis 42 and passes through the center of the second photodetector 41, to thereby make the differential output of the second photodetector 41 to be "0". In addition, the second photodetector 41 is inclined at an angle $\theta_1$ with respect to the second plane orthogonal to the optical axis 42 so that the front face of the second photodetector 41 is directed to the holographic element 33. By thus doing, as shown in FIGS. 12A and 12B-FIGS. 4A and 14B, the defocusing components of the first-order diffraction light spot SB of the light beam for BD use and the first-order diffraction light spot SC of the light beam for CD use can be reduced as far as possible, and both of the first-order diffraction light spots SB and SC are received on the parting line of the second photodetector 41.

Thus, the defocusing components of the first-order diffraction light spots SB and SC at both ends on the photodetector 41 can be canceled by the inclinations of the second photodetector 41, and therefore good first-order diffraction spots SB, SD, and SC can be formed. In addition, the area of the second photodetector 41 can be further reduced, and focusing error signals can be obtained by the Foucault method at a high speed of response.

Third Embodiment

Figure 15:
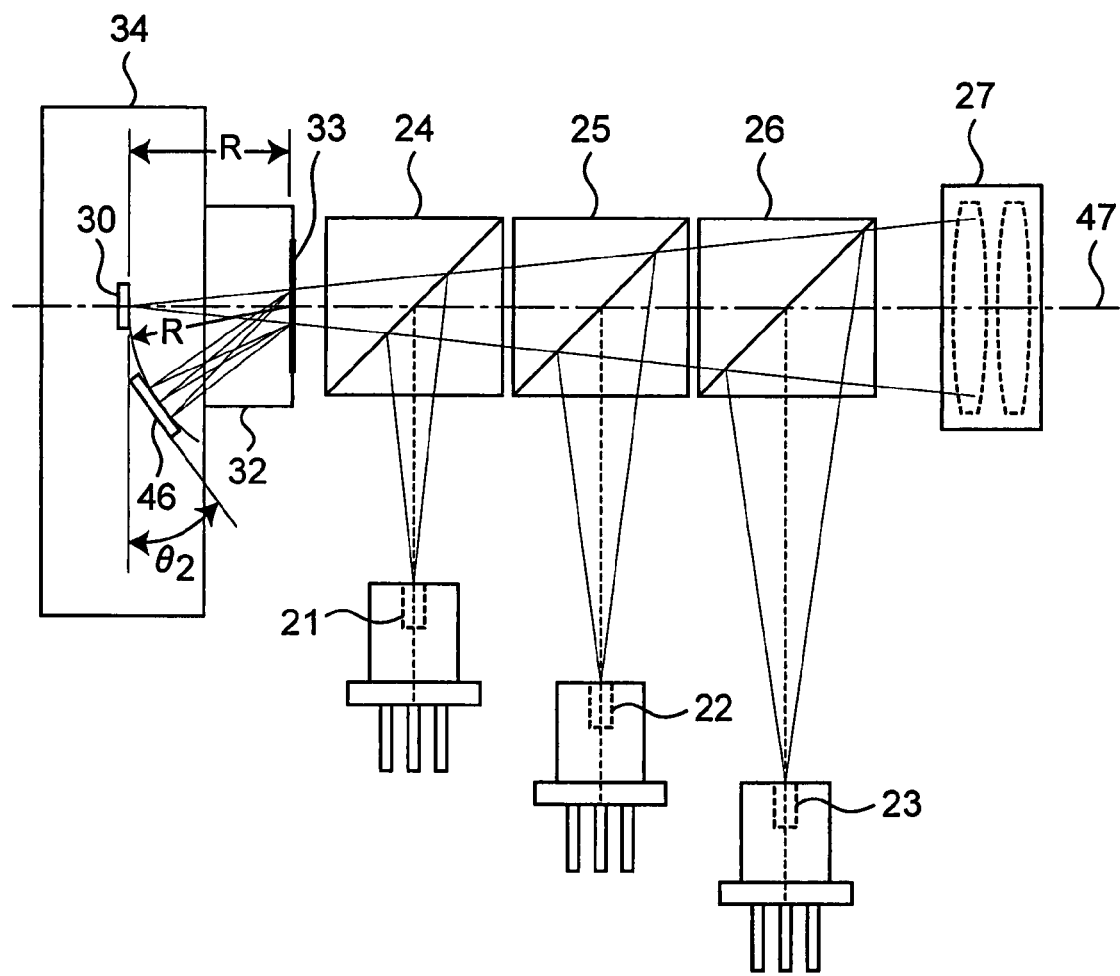
FIG. 15 is a plan view of an optical system of an optical pickup device of a third embodiment of the present invention.

FIG. 15 is a plan view of an optical system of the optical pickup device of the third embodiment. In FIG. 15, a light source for BD use 21, a light source for DVD use 22, a light source for CD use 23, beam splitters 24, 25, and 26, a collimating lens 27, a diffraction element base 32, a holographic element 33, a light-receiving unit package 34, and a first photodetector 30 are identical to those in the first embodiment shown in FIGS. 1 and 2. In FIG. 15, an erecting mirror 28, an objective lens 31, and a disc 29 are omitted.

In this embodiment, the second photodetector 46 is disposed in such a manner that when a circle passing through the center of the first photodetector 30 is drawn on condition that a distance R between the holographic element 33 and the first photodetector 30 is a radius of the circle and the center of the holographic element 33 is the center of the circle, the center of the second photodetector 46 is positioned on the circle and first-order diffraction light from the holographic element 33 is incident upon the second photodetector 46. In addition, in the state that a light beam emitted from the light source 21, 22, or 23 is focused on the disc 29, the parting line of the second photodetector 46 is inclined at a first predetermined angle with respect to a first plane which includes an optical axis 47 and passes through the center of the second photodetector 46, to thereby make the differential output of the second photodetector 46 to "0". In addition, the second photodetector 46 is inclined at a second predetermined angle with respect to a second plane orthogonal to the optical axis 47 so that the front face of the second photodetector 46 is directed to the holographic element 33. The second predetermined angle is set to an angle $\theta_2$ of a tangent to the circle at the center of the second photodetector 46 with respect to the second plane.

The shorter wavelength-side first-order diffraction light spot and the longer wavelength-side first-order diffraction light spot are almost equally deviated from the position of the first-order diffraction light spot of a light beam having a wavelength near the set wavelength of the hologram pattern, and are formed on the second photodetector 46 with nearly equal defocusing components. However, by disposing the second photodetector 46 as described above, increase of the diameter of a spot on the second photodetector 46 caused by defocusing can be minimized as far as possible for both of the light beam having the shortest wavelength and the light beam having the longest wavelength. Thus, the area of the second photodetector 46 can be reduced, and focusing error signals can be obtained by the Foucault method at a high speed of response.

In other words, according to this embodiment, a stable signal detection characteristic can be obtained.

Fourth Embodiment

Figure 16:
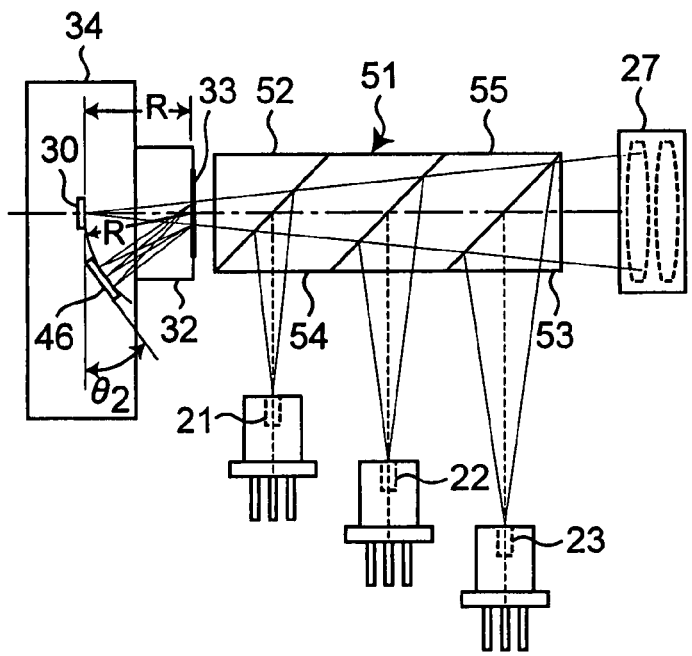
FIG. 16 is a plan view of an optical system of an optical pickup device of a fourth embodiment of the present invention.

FIG. 16 is a plan view of an optical system of the optical pickup device of the fourth embodiment. In FIG. 16, a light source for BD use 21, a light source for DVD use 22, a light source for CD use 23, a collimating lens 27, a diffraction element base 32, a holographic element 33, a light-receiving unit package 34, and a first photodetector 30 are identical to those in the first embodiment shown in FIGS. 1 and 2. In addition, a second photodetector 46 is identical to that in the third embodiment shown in FIG. 15. In FIG. 16, an erecting mirror 28, an objective lens 31 and a disc 29 are omitted.

In this embodiment, the beam splitter for BD use 24, the beam splitter for DVD use 25, and the beam splitter 26 for CD use in the first embodiment shown in FIG. 1 are integrated as one beam splitter 51. This beam splitter 51 is formed in the following way, for example. That is, two prisms 52 and 53 having a cross sectional shape of a right-angled isosceles triangle and two prisms 54 and 55 having a cross sectional shape of a parallelogram are formed by stacking sufficiently large flat glasses and cutting them at an angle of 45 degrees. The two prisms 54 and 55 are stuck on each other at their 45 degrees cut surfaces to form a parallelogram prism. Then the 45 degrees cut surface of the prism 52 is stuck on the other 45 degrees cut surface of the prism 54 is, and the 45 degrees cut surface of the prism 53 is stuck on the other 45 degrees cut surface of the prism 55. By using such a forming method, a low-cost and stable beam splitter 51 can be achieved.

As described above, in this embodiment, the beam splitter for BD use 24, the beam splitter for DVD use 25, and the beam splitter 26 for CD use in the first embodiment shown in FIG. 1 are integrated as one beam splitter 51. It is therefore not required to align the three beam splitters 24, 25, and 26 coaxially on the optical axis passing through the disc and the first photodetector 30 via the erecting mirror 28 as in the case of the first embodiment. Because of this, it becomes easy to assemble the optical components.

Fifth Embodiment

Figure 17:
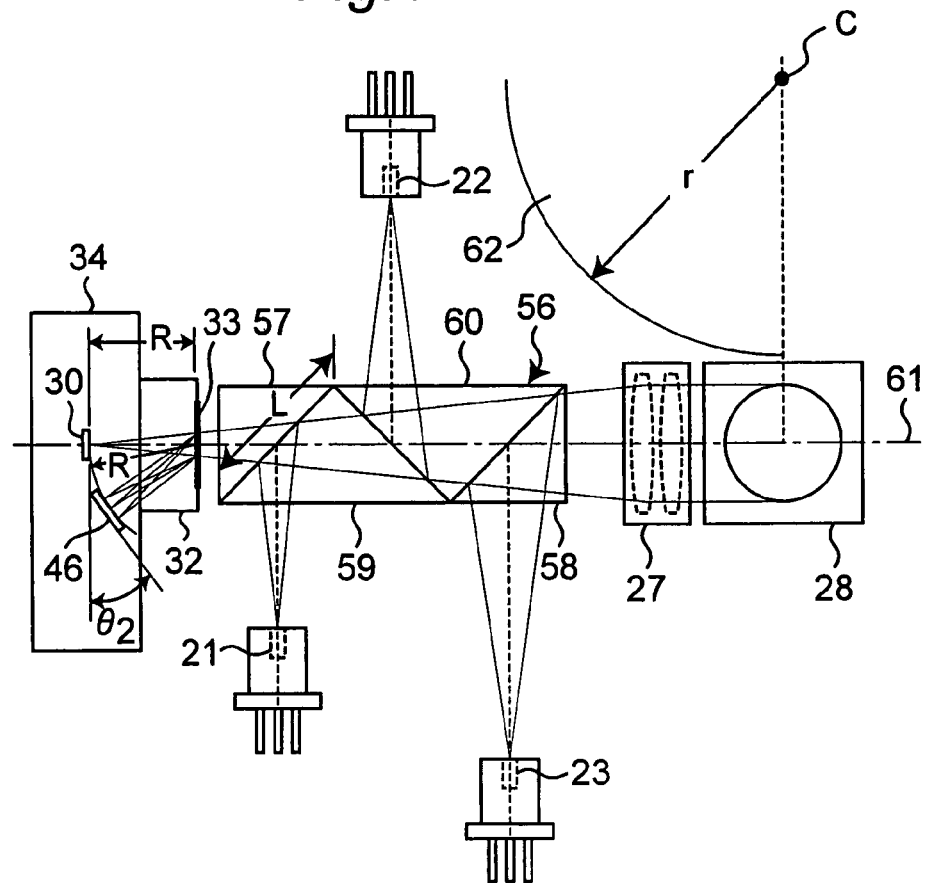
FIG. 17 is a plan view showing an example of an optical system of an optical pickup device of a fifth embodiment of the present invention.

FIG. 17 is a plan view showing an example of an optical system of the optical pickup device of the fifth embodiment. In FIG. 17, a light source for BD use 21, a light source for DVD use 22, a light source for CD use 23, a collimating lens 27, an erecting mirror 28, a diffraction element base 32, a holographic element 33, a light-receiving unit package 34, and a first photodetector 30 are identical to those in the first embodiment shown in FIGS. 1 and 2. In addition, a second photodetector 46 is identical to that in the third embodiment shown in FIG. 15. In FIG. 17, an objective lens 31 and a disc 29 are omitted.

In this embodiment, the beam splitter for BD use 24, the beam splitter for DVD use 25, and the beam splitter 26 for CD use in the first embodiment shown in FIG. 1 are integrated as one beam splitter 56. This beam splitter 56 is formed in the following way, for example. That is, two prisms 57 and 58 having a sectional form of a right-angled isosceles triangle in which the length of a side facing the right angle is L and two prisms 59 and 60 having a cross sectional shape of a right-angled isosceles triangle in which the length of two sides with a right angle in between is L are formed by stacking sufficiently large flat glasses and cutting them at an angle of 45 degrees. The two prisms 59 and 60 are stuck on each other at a cut surface of length L to form a prism having a sectional shape of a parallelogram. Then, the cut surfaces of length L of the prism 57 and 58 are stuck on the two cut surfaces of length L of the sectionally parallelogram prism. Such a forming method makes it possible to form a low-cost and stable beam splitter 56.

In addition to the above configuration of the beam splitter 56, the light source for BD use 21, the light source for DVD use 22, and the light source for CD use 23 are staggered on opposite sides of an optical axis 61 in order that the optical axes of light beams from the respective light sources 21, 22, and 23 after their directions have been changed by the beam splitter 56 are matched with the optical axis 61.

As described above, the three light sources 21, 22, and 23 are staggered on opposite sides of the optical axis 61, so that the light beams from the light sources 21, 22, and 23 can be prevented from interfering with each other, thereby further size reduction of the optical pickup device becomes easy.

In addition, the light source 23, which may mechanically interfere with a spindle motor 62 (partially shown schematically) for rotating a disc 29 (see FIG. 2) when the three light sources 21, 22, and 23 are arranged on the same side as the spindle motor 62 of the optical axis 61, is disposed on the side opposite to the spindle motor 62 of the optical axis 61. Like this, the light source 23 is disposed out of the area of the spindle motor, so that the light source 23 can be prevented from mechanically interfering with the disc 29 and the spindle motor 62, and thereby a low-cost spindle motor having a standard diameter can be adopted. Thus, it is possible to achieve the cost reduction and the further downsizing and weight reduction of the optical pickup device. In the figure, C denotes a center axis of the spindle motor 62, and r denotes a radius of the spindle motor 62.

Figure 18:
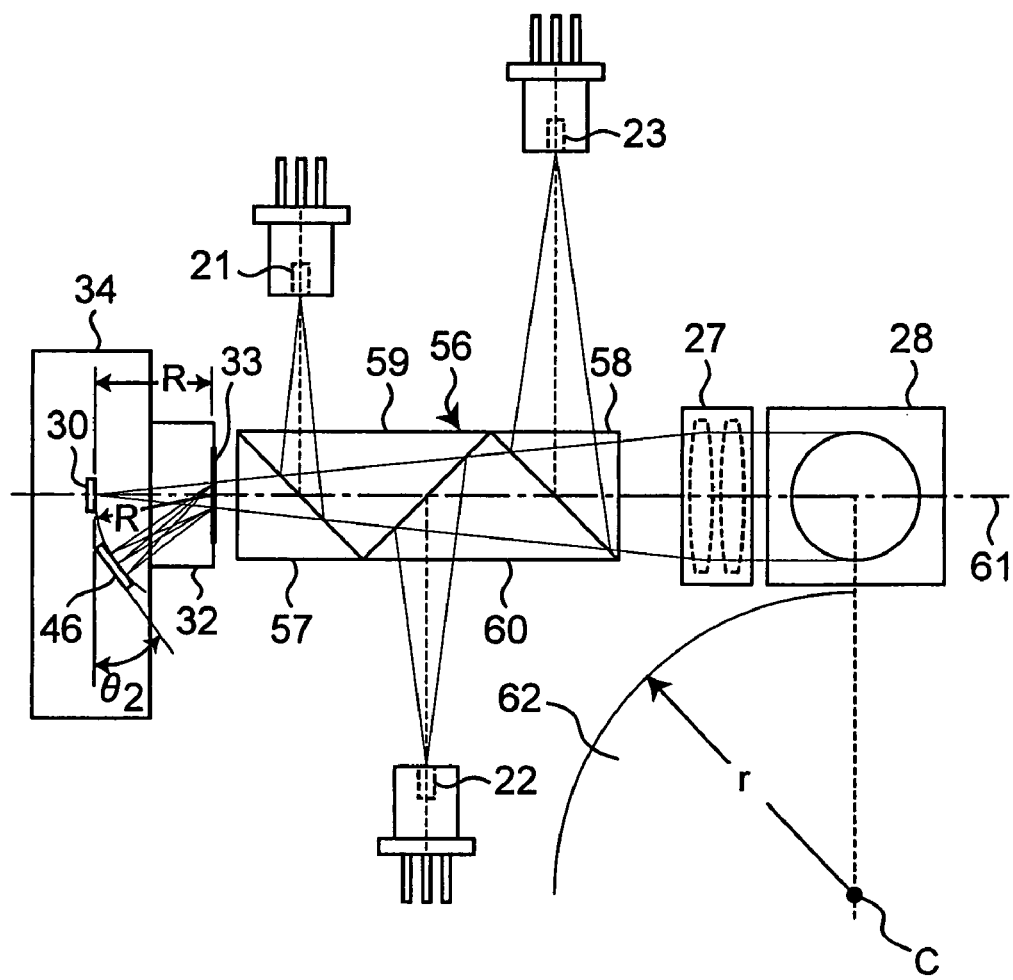
FIG. 18 is a plan view showing an example different from the example in FIG. 7 of the optical system of the optical pickup device of the fifth embodiment of the present invention.

FIG. 18 is a plan view of an optical system of an optical pickup device used in the case that the spindle motor 62 for rotating a disc 29 is positioned on the side opposite to the case shown in FIG. 17 of the optical axis 61. In FIG. 18, the beam splitter 56 of the optical pickup device shown in FIG. 17 has been rotated 180 degrees around the optical axis 61. According to this configuration, the three light sources 21, 22, and 23 are staggered on sides opposite to those in FIG. 17 of the optical axis 61.

Due to this arrangement of this optical pickup device wherein the spindle motor 62 is disposed on the side opposite to that in FIG. 17 of the optical axis 61, the light source 23 nearest to the spindle motor in the direction of the optical axis 61 can be prevented from mechanically interfering with the disc 29 and the spindle motor.

As described above, in this embodiment, the beam splitter for BD use 24, the beam splitter for DVD use 25, and the beam splitter for CD use 26 in the first embodiment shown in FIG. 1 are integrated as one beam splitter 56. It is therefore not required to align the three separate beam splitters 24, 25, and 26 coaxially on the optical axis 61 as in the case of the first embodiment. Because of this, it becomes easy to assemble the optical components.

In addition, the three light sources 21, 22, and 23 are staggered on opposite sides of the optical axis 61, so that the light beams from the light sources 21, 22, and 23 can be prevented from interfering with each other, thereby further size reduction of the optical pickup device becomes easy. Furthermore, the light source 23 nearest, in the direction of the optical axis 61, to the spindle motor 62 for rotating a disc 29 is disposed out of the area of the spindle motor, so that the light source 23 can be prevented from mechanically interfering with the disc 29 and the spindle motor, and it is possible to reduce the cost of the optical pickup device and further reduce the size and weight of the optical pickup device.

In this embodiment, examples of staggering the three light sources on opposite sides of the optical axis 61 are shown in an optical pickup device using one beam splitter 56 in which the beam splitter for BD use, the beam splitter for DVD use, and the beam splitter for CD use are integrated. However, the present invention is not limited to this. For example, even if the orientation of the beam splitter for BD use 24, the beam splitter for DVD use 25, or the beam splitter for CD use 26 in FIG. 1 is changed by 180 degrees, the three light sources 21, 22, and 23 may be staggered on opposite sides of the optical axis 37.

Sixth Embodiment

Figure 19:
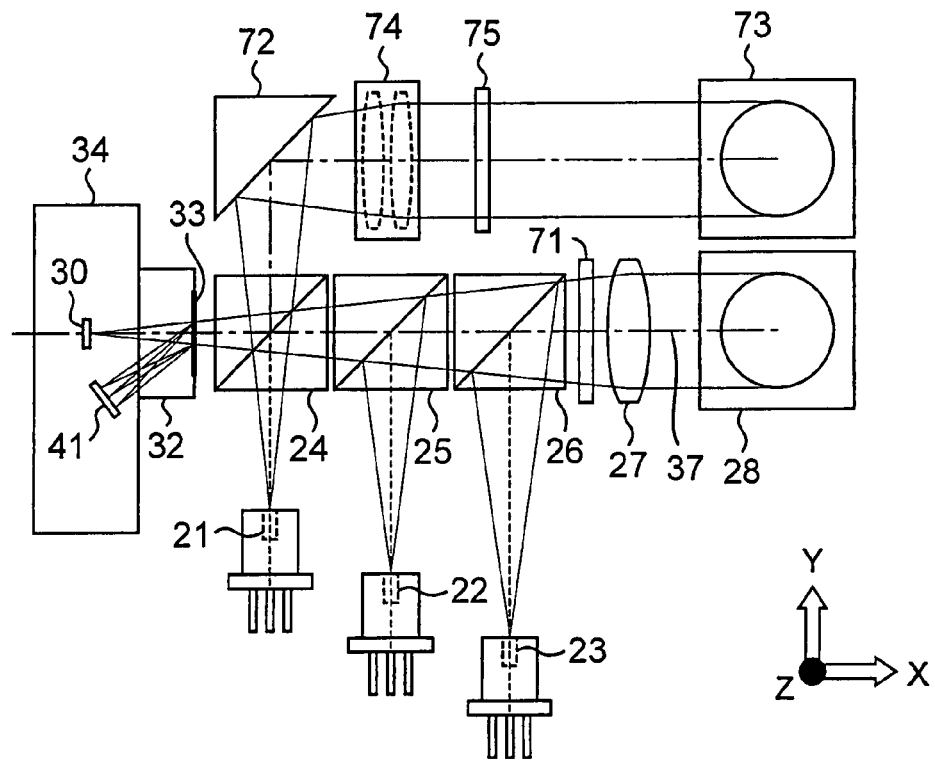
FIG. 19 is a plan view of an optical system of an optical pickup device of a sixth embodiment of the present invention.

FIG. 19 is a plan view of an optical system of the optical pickup device of the sixth embodiment. In FIG. 19, a light source for BD use 21, a light source for DVD use 22, a light source for CD use 23, beam splitters 24, 25, and 26, a collimating lens 27, an erecting mirror 28, a diffraction element base 32, a holographic element 33, a light-receiving unit package 34, and a first photodetector 30 are identical to those in the first embodiment shown in FIGS. 1 and 2. In addition, a second photodetector 41 is identical to that in the second embodiment shown in FIG. 9. In FIG. 19, an objective lens 31 and a disc 29 are omitted.

In this embodiment, a quarter wavelength plate 71 is provided between the beam splitter for CD use 26 and the collimating lens 27. In addition, a mirror 72 is disposed on a side opposite to the light source 21 of the beam splitter for BD use 24, an erecting mirror 73 is provided in parallel with the erecting mirror 28, and a collimating lens 74 and a quarter wavelength plate 75 both for BD use are disposed between the mirror 72 and the erecting mirror 73 in this order when viewed from the mirror 72.

The optical axis of a light beam having a long wavelength emitted from the light source for CD use 23 and the optical axis of a light beam emitted from the light source for DVD use 22 and having a wavelength almost intermediate between the wavelength of the light source 21 and the wavelength of the light source 23 are bent by the corresponding beam splitters 25 and 26, and then matched with the optical axis 37. These light beams each pass through the quarter wavelength plate 71, are made substantially parallel beams by, the collimate lens 27, are erected by the erecting mirror 28, and are applied to a disc 29 (see FIG. 2) by an objective lens 31 (see FIG. 2). Reflected light from the disc 29 follows the same route as the applied light back, passes through the beam splitters 26, 25, and 24, and arrives at the holographic element 33 on the diffraction element base 32.

In contrast to this, a light beam having a short wavelength which has been emitted from the light source for BD use 21 and then passed through the beam splitter 24 is bent by the mirror 72, and is then made a substantially parallel beam by the collimating lens for BD use 74 which is configured so as to be able to correct spherical aberration. This parallel beam passes through the quarter wavelength plate 75, is erected toward a BD (not shown) by the erecting mirror 73 which is different from the erecting mirror (for DVD/CD) 28, and is applied to the BD via an objective lens for BD use (not shown). Reflected light from the BD follows the same route as the applied light back and is reflected by the beam splitter 24. After that the reflected light follows the same optical path as the light beams from the light sources 22 and 23 to arrive at the holographic element 33 on the diffraction element base 32.

The light beams from the light sources 21, 22, and 23 are converted to transmitted light (zero-order diffraction light) and first-order diffraction light by the holographic element 33. The zero-order diffraction light which has passed through the holographic element 33 is received by the first photodetector 30 in the light-receiving unit package 34, while the first-order diffraction light diffracted by the holographic element 33 is received by the second photodetector 41 in the light-receiving unit package 34.

The quarter wavelength plates 71 and 75 are used to circularly polarize light applied to a DVD or CD 29 and light applied to a BD, respectively.

As described above, in this embodiment, an optical path of light from the light source 21 for a BD which is a special recording medium is provided in addition to an optical path of light from the light sources 22 and 23 for a DVD or CD 29, and the collimating lens 74 and quarter wavelength plate 75 for BD use are disposed on the optical path for BD use. With this arrangement, aberration correction most suitable for a BD can be performed by the collimating lens for BD use 74 and the objective lens for BD use.

In addition, signals read from a BD can be detected by the photodetectors 30 and 41 which also detect signals read from a DVD or CD. Because of this, it is not necessary to provide two detecting systems which are a detecting system for BD use and a detecting system for DVD/CD use, thereby simplifying the detecting circuit.

In other words, according to this embodiment, a performance increase and cost reduction of an optical pickup device can be achieved simultaneously.

Seventh Embodiment

Figure 20:
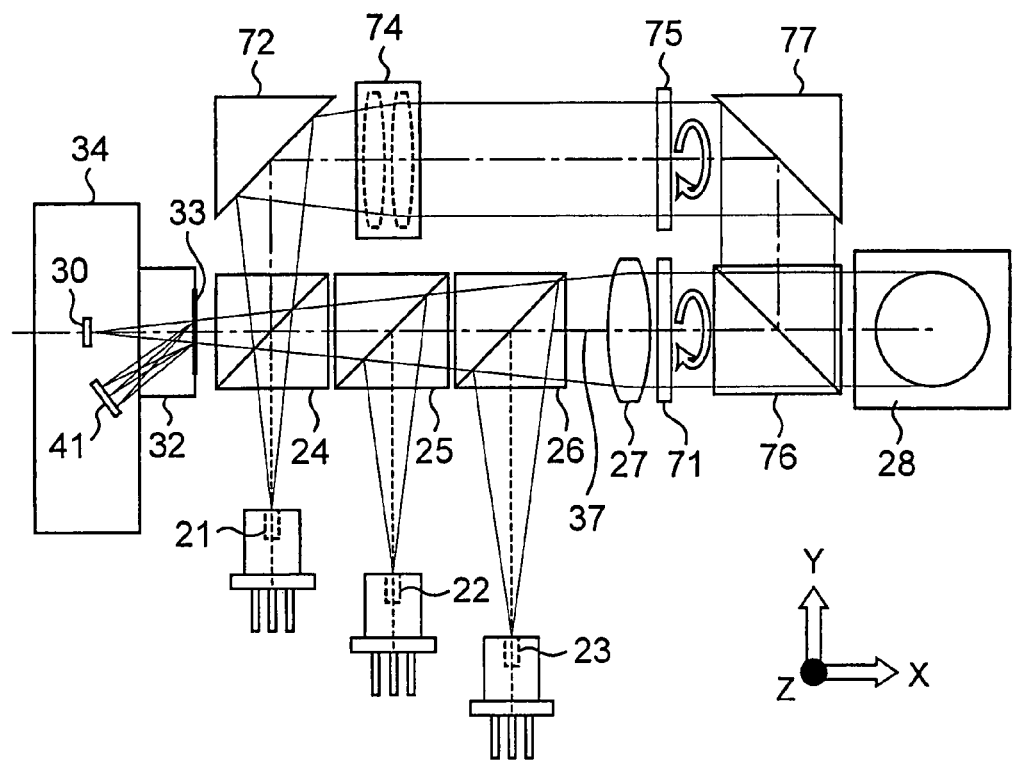
FIG. 20 is a plan view of an optical system of an optical pickup device of a seventh embodiment of the present invention.

FIG. 20 is a plan view of an optical system of the optical pickup device of the seventh embodiment. In FIG. 20, a light source for BD use 21, a light source for DVD use 22, a light source for CD use 23, beam splitters 24, 25, and 26, a collimating lens 27, an erecting mirror 28, a diffraction element base 32, a holographic element 33, a light-receiving unit package 34, and a first photodetector 30 are identical to those in the first embodiment shown in FIGS. 1 and 2. In addition, a second photodetector 46 is identical to that in the second embodiment shown in FIG. 9. Furthermore, a quarter wavelength plate 71, a mirror 72, a collimating lens for BD use 74, and a quarter wavelength plate 75 are identical to those in the sixth embodiment shown in FIG. 19. In FIG. 20, an objective lens 31 and a disc 29 are omitted.

In this embodiment, a synthesis prism 76 is disposed between the quarter wavelength plate 71 and the erecting mirror 28. Disposed after the quarter wavelength plate 75 is a mirror 77 for bending a light beam from the collimating lens for BD use 74 toward the synthesis prism 76.

The optical axis of a light beam having a long wavelength that is emitted from the light source for CD use 23 and the optical axis of a light beam having a wavelength almost intermediate between the wavelength of the light source 21 and the wavelength of the light source 23 that is emitted from the light source for DVD use 22 are bent by the beam splitters 25 and 26, respectively, and then matched with the optical axis 37. These light beams are made substantially parallel beams by the collimate lens 27, are circularly polarized by the quarter wavelength plate 71, pass through the synthesis prism 76, are erected by the erecting mirror 28, and are applied to a disc (see FIG. 2) via the objective lens 31 (see FIG. 2). Reflected light from the disc 29 follows the same route as the applied light back, passes through the beam splitters 26, 25, and 24, and arrives at the holographic element 33 on the diffraction element base 32.

In contrast to this, a light beam having a short wavelength which has been emitted from the light source for BD use 21 and then passed through the beam splitter 24 is bent by the mirror 72, and is then made a substantially parallel beam by the collimating lens for BD use 74 which is configured so as to be able to correct spherical aberration. This parallel beam is circularly polarized by the quarter wavelength plate 75, is bent by the mirror 77 and the synthesis prism 76 to be coaxial with light beams from the light sources 22 and 23, is erected by the erecting mirror 28, and is applied to a disc 29 by the objective lens 31. Reflected light from the disc 29 follows the same route as the applied light back to the beam splitter 24, and is reflected by the beam splitter 24. After that the reflected light follows the same optical path as the light beams from the light sources 22 and 23 to arrive at the holographic element 33 on the diffraction element base 32.

The light beam from the light source 21, 22, or 23 is converted to transmitted light (zero-order diffraction light) and first-order diffraction light by the holographic element 33. The zero-order diffraction light which has passed through the holographic element 33 is received by the first photodetector 30 in the light-receiving unit package 34, while the first-order diffraction light diffracted by the holographic element 33 is received by the second photodetector 41 in the light-receiving unit package 34.

As described above, in this embodiment, in addition to an optical path of light from the light source 22 or 23 used when the disc 29 is a DVD or CD, an optical path of light from the light source 21 used when the disc 29 is a BD, a special recording medium, is provided, and the collimating lens for BD use 74 and the quarter wavelength plate 75 are disposed on the optical path for BD use. With this arrangement, aberration correction most suitable for a BD can be performed by the collimating lens for BD use 74.

In addition, signals read from the disc 29 when it is a BD can be detected by the photodetectors 30 and 41 which are also used to detect signals read from the disc 29 when it is a DVD or CD. Because of this, it is not necessary to provide two detecting systems including a detecting system for BD use and a detecting system for DVD/CD use, which makes it possible to simplify the detecting circuit configuration.

In other words, according to this embodiment, a performance increase and cost reduction of an optical pickup device can be achieved simultaneously.

Eighth Embodiment

Figure 21A:
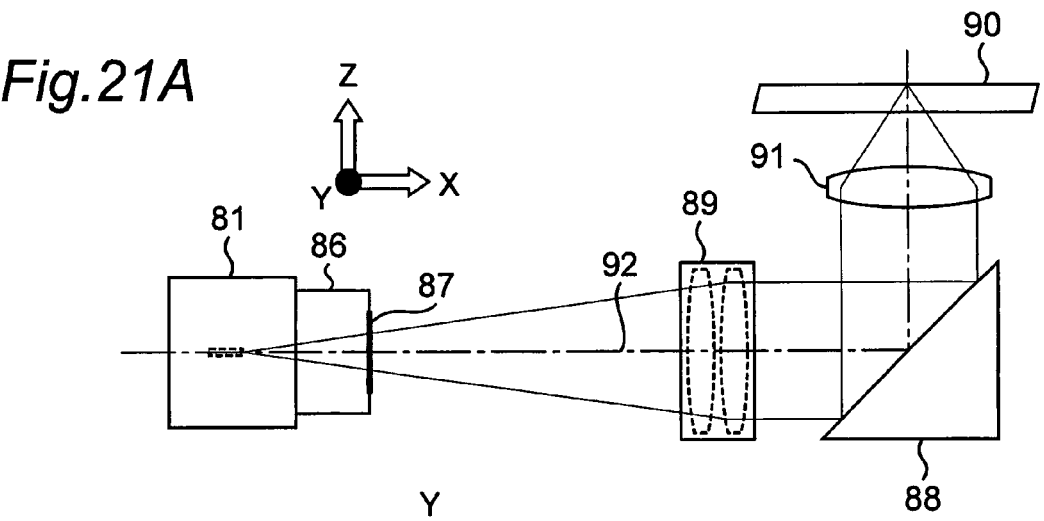
FIG. 21A is a side view of an optical system of an optical pickup device of an eighth embodiment of the present invention.
Figure 21B:
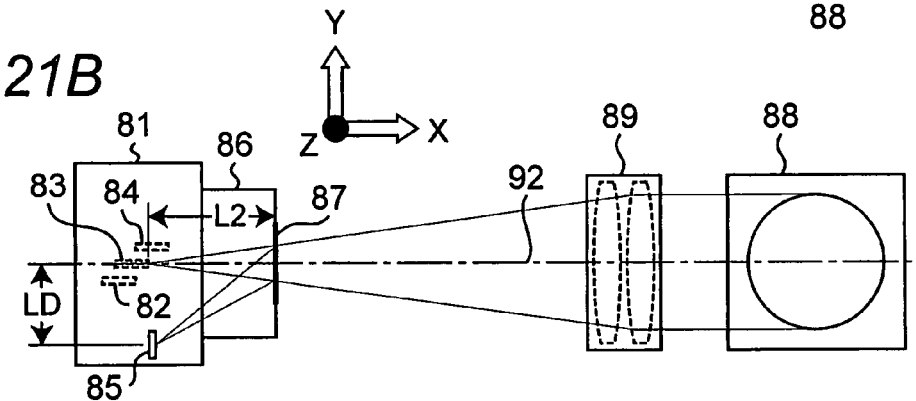
FIGS. 21B, 21C, and 21D are plan views of the optical system shown in FIG. 21A and show optical paths of light from different light sources.
Figure 21C:
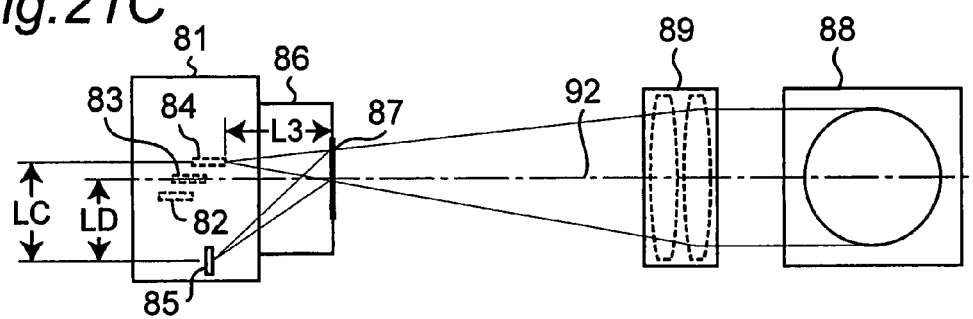
Figure 21D:
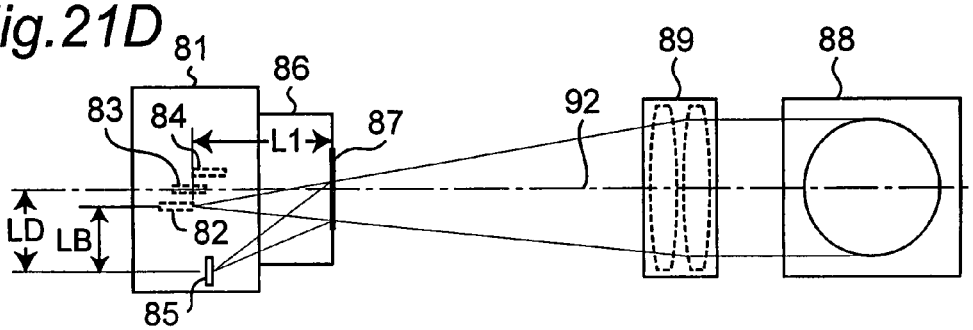

FIG. 21A is a side view of an optical system of the optical pickup device of the eighth embodiment, and FIGS. 21B to 21D are plan views of the optical system in FIG. 21A, showing optical paths of light emitted from different light sources. This optical pickup device is so configured that signals can be read from and written to a normal density recording disc such as a CD, a high density recording disc such as a DVD, and an ultra-high density recording disc such as a BD by selecting a light source to be used.

In FIG. 21A, the reference numeral 81 denotes a light-receiving/emitting unit package in which a first light source for BD use 82 of a short wavelength, a third light source for CD use 84 of a long wavelength, a second light source for DVD use 83 of a wavelength almost intermediate between the wavelength of the first light source 82 and the wave length of the third light source 84, and a photodetector 85 are installed. The photodetector 85 is disposed in such a manner that its light-receiving surface is parallel to the light-emitting surface of the light-receiving/emitting unit package 81. A diffraction element base 86 is stuck on the light-emitting surface of the light-receiving/emitting unit package 81, and a holographic element 87 is provided on a surface of the diffraction element base 86 opposite to the surface on which the light-receiving/emitting unit package 81 is stuck. Furthermore, a collimating lens 89 for correcting spherical aberration in accordance with the type of a recording disc 90 to be used is disposed between an erecting mirror 88 for erecting a light beam toward the disc 90 and the diffraction element base 86. In addition, an objective lens 91 is disposed between the erecting mirror 88 and the disc 90.

In the above configuration, the optical axes of light beams emitted from the first light source 82, the second light source 83, and the third light source 84 are changed at the collimating lens 89 by the holographic element 87 so as to match with an optical axis 92 connecting the second light source 83 and the collimating lens 89, as shown in FIGS. 21D, 21B, and 21C, respectively. A light beam, the spherical aberration of which has been corrected in accordance with a disc to be used, and which has been made a substantially parallel beam, and the optical axis of which has been matched with the optical axis 92, is erected toward the disc 29 by the erecting mirror 88, and is applied to the disc 29 via the objective lens 91. Reflected light from the disc 29 follows the same route as the applied light back to the holographic element 87 on the diffraction element base 86. The first-order diffraction light diffracted by the holographic element 87 is received by the photodetector 85 in the light-receiving/emitting unit package 81.

Figure 22:
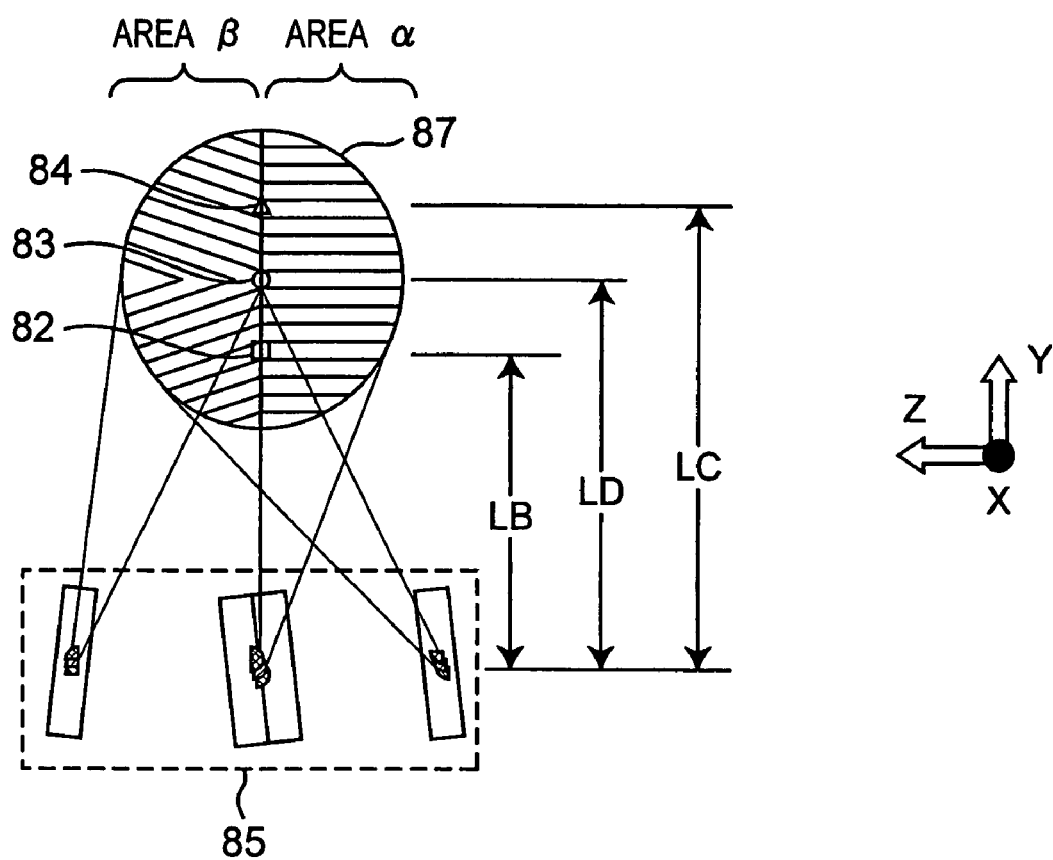
FIG. 22 shows the positional relation between a holographic element and a photodetector in FIG. 21A.

FIG. 22 shows the positional relation between the holographic element 87 and the photodetector 85. The hologram pattern of the holographic element 87 is set with an almost middle wavelength of the three wavelengths of the first light source 82 to the third light source 84. Because of this, as understood from the equation (1) showing the relation between the wavelength, the diffraction angle, and the grating pitch, the spot of a light beam of the shortest wavelength for BD use would be formed nearest to the optical axis 92 on the photodetector 85, and the spot of a light beam for DVD use and the spot of a light beam for CD use would be formed further from the optical axis 92 in order.

For this reason, in this embodiment, the distances from the photodetector 85 to the first to third light sources 82-84 installed in the light-receiving/emitting package 81 are set to be longer in order of increasing wavelength. In other words, as shown in FIGS. 21B to 21D and FIG. 22, the first light source 82 to the third light source 84 are disposed in such a manner that the relation of:

LB<LD<LC holds, where LB is the distance from the photodetector 85 to the first light source 82, LD is the distance from the photodetector 85 to the second light source 83, and LC is the distance from the photodetector 85 to the third light source 84. Thus, positional deviations among the spot of the light beam for BD use, the spot of the light beam for DVD use, and the spot of the light beam for CD use which are formed on the photodetector 85 can be canceled, whereby the spots are formed in nearly equal positions on the photodetector 85.

Furthermore, when the photodetector 85 is disposed in such a manner that its light-receiving surface is parallel to the light-emitting surface of the light-receiving/emitting unit package 81, a first-order diffraction light spot created by light from the second light source 83 of a wavelength near the set wavelength of the hologram pattern would be formed on the photodetector 85 with almost no aberration included, a first-order diffraction light spot created by light from the first light source of a wavelength shorter than the set wavelength would be formed in a state before focusing, and a first-order diffraction light spot created by light from the third light source 84 of a wavelength longer than the set wavelength would be formed in a state after focusing.

For this reason, in this embodiment, the distances from the holographic element 87 to the light-emitting surfaces of the first light source 82 to the third light source 84 installed in the light-receiving/emitting package 81 are set to be longer in order of decreasing wavelength. In other words, as shown in FIGS. 21B to 21D, the first light source 82 to the third light source 84 are disposed in such a manner that the relation

L3<L2<L1 holds, where L1 is the distance from the holographic element 87 to the first light source 82, L2 is the distance from the holographic element 87 to the second light source 83, and L3 is the distance from the holographic element 87 to the third light source 84. Thus, the defocusing components on the photodetector 85 due to the wavelengths of the first light source 82 to third light source 84 can be canceled, thereby forming the spots in a focused state with almost no aberration.

As described above, in this embodiment, the first light source for BD use 82, the second light source for DVD use 83, and the third light source for CD use 84 are installed in the light-receiving/emitting unit package 81, and the holographic element 87 is provided on the light-emitting surface of the diffraction element base 86 stuck on the light-emitting surface of the light-receiving/emitting unit package 81. The first to third light sources 82-84 are arranged in such a manner that the relation of "LB<LD<LC" holds where LB, LD, and LC are the distances from the photodetector 85 to the light sources 82, 83, and 84, respectively, and that the relation of "L3<L2<L1" holds where L1, L2, and L3 are the distances from the holographic element 87 to the light sources 82, 83, and 84, respectively.

With the above arrangement, positional deviations and defocusing of spots of light beams for BD use, DVD use, and CD use on the photodetector 85 caused by the difference of wavelengths of the light beams can be corrected, whereby the spots with almost no aberration are formed, focused in almost same positions on the photodetector 85.

In other words, according to this embodiment, the whole of the light-receiving portion including the photodetector 85 can be made smaller, to say nothing of downsizing the photodetector 85. Thus, the reliability of the optical pickup device can be increased and cost reduction of it can be achieved.

In this embodiment, only hologram first-order diffraction light from the holographic element 87 is used to obtain not only focusing error signals from area α of the holographic element 87 but also tracking signals from area β of the holographic element 87 by a push-pull method. Also, RF signals are obtained by adding all the signals of the photodetector. Because of this, information can be recorded on or replayed from three kinds of recording media, which are a BD, a DVD, and a CD, by an optical system simplified to the limit.

Ninth Embodiment

Figure 23:
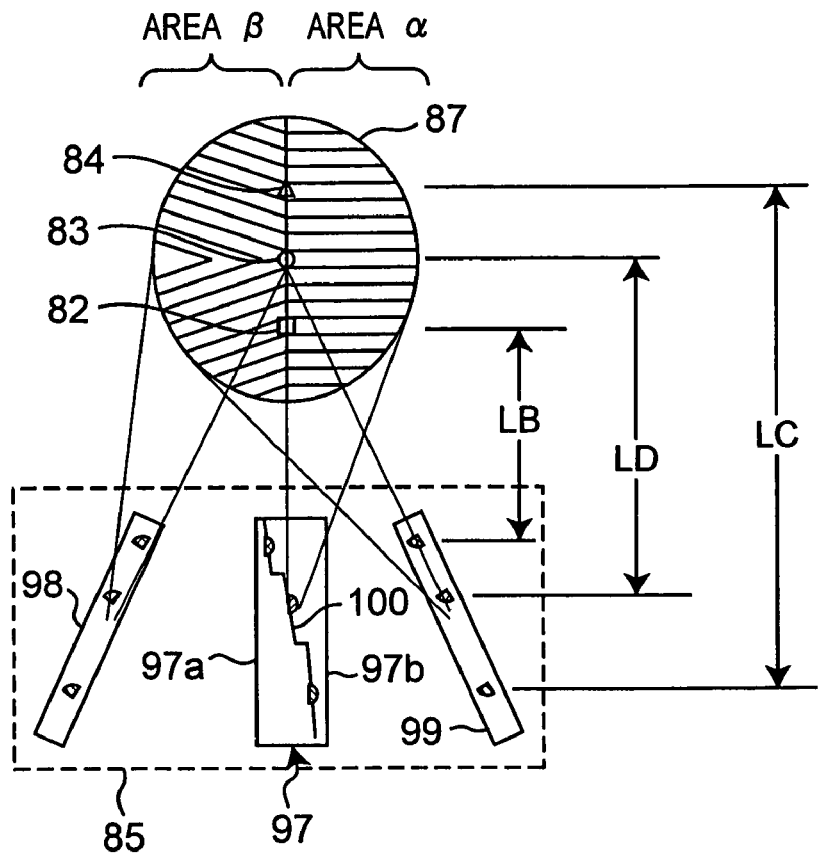
FIG. 23 shows the positional relation between a holographic element and a photodetector in an optical pickup device of a ninth embodiment of the present invention.

FIG. 23 shows the positional relation between the holographic element and the photodetector in the optical pickup device of the ninth embodiment. The basic configuration of the whole of the optical system of this embodiment is identical to that of the eighth embodiment shown in FIG. 21. However, this embodiment is different from the eighth embodiment in that the first light source 82 and the third light source 84 are installed nearer to the second light source 83 than those of the eighth embodiment so that first-order diffraction light spots are formed at different points on the photodetector 85. In the following description, reference numerals identical to those in FIG. 21 are used.

Reference numeral 97 denotes a two-element light-receiving section of the photodetector 85 for detecting focusing error signals from the area α in the holographic element 87, and reference numerals 98 and 99 denote light-receiving sections of the photodetector 85 for detecting tracking error signals from the area β in the holographic element 87 by a push-pull method.

As described above, the first light source 82 and the third source 84 are disposed nearer to the second light source 83 than those in the eighth embodiment, and the first-order diffraction light spot of a light beam from the first light source 82, the first-order diffraction light spot of a light beam from the third light source 84, and the first-order diffraction light spot of a light beam from the second light source 83 are formed in regions at different distances from the optical axis 92 on the two-element light-receiving section 97 in accordance with the wavelengths of the light sources.

Furthermore, the wavelength of light from the first light source 82, the wavelength of light from the second light source 83, and the wavelength of light from the third light source 84 vary with variations in ambient temperature. Changes in wavelength along with variations in temperature range between about 0.2 nm/° C. to 0.25 nm/° C. for any one of the three light sources 82, 83, and 84. Because of this, for example, 50° C. temperature rise causes the wavelength change of +11.25 nm. As a result, according to the equation (1) "sin α=λ/d", the diffraction angle α increases because the grating pitch d is constant. On the other hand, temperature drop reduces the diffraction angle α. In other words, distances from the optical axis to the positions on the two-element light-receiving section 97 of the spot of a light beam for BD use, the spot of a light beam for DVD use, and the spot of a light beam for CD use vary with variations in ambient temperature.

If the distances from the optical axis 92 to the positions of the first-order diffraction light spot of a light beam for BD use, the first-order diffraction light spot of a light beam for DVD use, and the first-order diffraction light spot of a light beam for CD use vary by changing the light sources 82, 83, and 84 and with variations in ambient temperature, the distances from the holographic element 87 to the first-order diffraction light spots will vary, so that the sizes of the spot of a light beam for BD use, the spot of a light beam for DVD use, and the spot of a light beam for CD use will also vary. Because of this, in order that the differential output from the two-element light-receiving section 97 is made "0" even if the sizes of the spots vary, it is required to incline the parting line of the two-element light-receiving section 97 with respect to the plane which includes the optical axis 92 and passes through the center of the two-element light-receiving section 97 as in the case of the first embodiment shown in FIGS. 5 to 8.

Since a light beam having a longer wavelength is inherently diffracted at a larger diffraction angle α, when the wavelength of the light beam varies, the position of the first-order diffraction light spot of the light beam varies significantly in the direction of extension of a plane which includes the optical axis 92 and passes through the center of the two-element light-receiving section 97. Because of this, it is required that the length of the parting line 100 in a light-receiving region for a longer wavelength should be set longer than that for a shorter wavelength. Furthermore, in the light-receiving area for a shorter wavelength, the distance of displacement of a first-order diffraction light spot in the direction of extension of the plane is shorter, but the distance of displacement in the direction perpendicular to the plane is longer, so that it is required that the angle of inclination of the parting line 100 should be larger than that for a longer wavelength.

Figure 24:
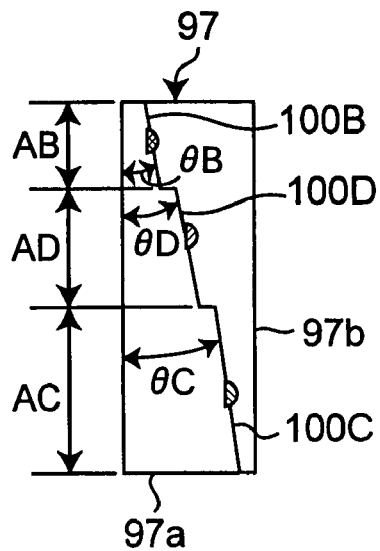
FIG. 24 illustrates a parting line of the photodetector in FIG. 23.

For this reason, in this embodiment, as shown in FIG. 24, the parting line 100 for splitting the two-element light-receiving section 97 into a light-receiving section 97a and a light-receiving section 97b is divided into three segments in the three areas AB, AD, and AC, and the positions, inclinations, and lengths of the three segments are set considering variations of the wavelengths of light beams from the light sources 82, 83, and 84 due to the switching of the light sources 82, 83, and 84 and variations in ambient temperature.

In FIG. 24, the area AB is an area for receiving a first-order diffraction light spot of a light beam for BD use (short wavelength), the area AD is an area for receiving a first-order diffraction light spot of a light beam for DVD use (intermediate wavelength), and the area AC is an area for receiving a first-order diffraction light spot of a light beam for CD use (long wavelength). Furthermore, θB is the angle of inclination of a parting line segment 100B for splitting the area AB in two, θD is the angle of inclination of a parting line segment 100D for splitting the area AD in two, and θC is the angle of inclination of a parting line segment 100C for splitting the area AC in two.

As described above, in this embodiment, the first to third light sources 82 to 84 are arranged in such a manner that the first-order diffraction light spots of light beams from the light sources 82 to 84 are formed in the areas AB, AD, and AC at different distances from the optical axis 92 on the two-element light-receiving section 97. In addition, the positions and the angles of inclination of the parting line segments 100B, 100D, and 100C in the areas AB, AD, and AC are set in such a manner that differential outputs from the two-element light-receiving section 97 become "0" even if the sizes of the first-order diffraction light spots vary due to the switching of the light sources 82, 83, and 84 and the variation in ambient temperature.

As a result, even if the wavelengths of light emitted from the light sources 82 to 84 vary with variations in ambient temperature, temperature compensation most suitable for the wavelengths of the light sources can be made with the two-element light-receiving section 97 having a smaller area, so that it is possible to make up a reliable light-receiving section with a photodetector 85 having a small area.

In the fourth and fifth embodiments, the second photodetector 46 of the third embodiment is used. Furthermore, in the sixth and the seventh embodiments, the second photodetector 41 of the second embodiment is used. However, second photodetectors to be used in the fourth to seventh embodiments are not limited to the second photodetectors 46 and 41, and second photodetectors suitable for the fourth to seventh embodiments may be selected from the second receptors of the first to third embodiments.

Embodiments of the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical pickup device for writing and reading signals to and from disc-shaped recording media having different recording densities comprises:
- first, second, and third light sources for emitting light beams of different wavelengths, wherein, of those different wavelengths, the wavelength of the light beam of the first light source is shortest and the wavelength of the light beam of the third light source is longest;
- a holographic element for dividing incoming light into zero-order diffraction light and first-order diffraction light;
- a first photodetector for receiving the zero-order diffraction light from the holographic element to obtain an RF signal and a tracking error signal;
- a beam splitter for changing an optical path of a light beam coming from the first light source, the second light source, or the third light source toward a recording medium and matching an optical axis of the changed optical path with an optical axis passing through the holographic element and the first photodetector, while directing reflected light from the recording medium to the holographic element; and
- a second photodetector for receiving the first-order diffraction light from the holographic element to obtain a focusing error signal.

2. The optical pickup device according to claim 1, wherein the holographic element has a hologram pattern that is set with a wavelength intermediate between the wavelength of the first light source and the wavelength of the third light source.

3. The optical pickup device according to claim 2, wherein the second photodetector is a two-element photodetector, and
- a parting line of the second photodetector is inclined at a predetermined angle relative to a plane which includes the optical axis and passes through a center of the second photodetector such that a differential output of the second photodetector is made "0" when the light beam from the first light source, the second light source, or the third light source is focused on the recording medium.

4. The optical pickup device according to claim 3, wherein the second photodetector is inclined at a predetermined angle different from the above predetermined angle relative to a plane orthogonal to the optical axis with a front face of the second photodetector directed to the holographic element such that the first-order diffraction light from the holographic element of the light beam from the first light source, the second light source, or the third light source is received on the parting line of the second photodetector under a condition that the light beam from the first light source, the second light source, or the third light source is focused on the recording medium.

5. The optical pickup device according to claim 3, wherein when a circle having a radius that is equal to a distance between the holographic element and the first photodetector and having a center at the center of the holographic element is drawn such that the circle passes through a center of the first photodetector, the center of the second photodetector is positioned on the circle, and the second photodetector is inclined at a predetermined angle with respect to a plane orthogonal to the optical axis so that a front face of the second photodetector is directed to the holographic element,
- the predetermined angle is set at an angle of a tangent to the circle at the center of the second photodetector relative to the plane, and
- the first-order diffraction light from the holographic element of the light beam from the first light source, the second light source, or the third light source is received on the parting line of the second photodetector with the light beams from the first light source, the second light source, or the third light source focused on the recording medium.

6. The optical pickup device according to claim 1, wherein the beam splitter for changing an optical path of a light beam coming from the first light source, the second light source, or the third light source toward a recording medium is an integrated prism common to the first light source, the second light source, and the third light source.

7. The optical pickup device according to claim 1, wherein the first light source, the second light source, and the third light source are staggered on opposite sides of the optical axis.

8. The optical pickup device according to claim 7, wherein of the first, second and third light sources, a light source that is nearest, with respect to a direction of the optical axis, to a spindle motor for rotating recording media is disposed on a side opposite to the spindle motor of the optical axis.

9. An optical pickup device for writing and reading signals to and from disc-shaped recording media having different recording densities comprises:
- first, second, and third light sources for emitting light beams of different wavelengths, wherein, of those different wavelengths, the wavelength of the light beam of the first light source is shortest and the wavelength of the light beam of the third light source is longest;
- a holographic element for dividing incoming light into zero-order diffraction light and first-order diffraction light;
- a first photodetector for receiving the zero-order diffraction light from the holographic element to obtain an RF signal and a tracking error signal;
- a first beam splitter for changing an optical path of a light beam coming from the second light source or the third light source toward a first recording medium and matching an optical axis of the changed optical path with an optical axis passing through the holographic element and the first photodetector, while directing reflected light from the first recording medium to the holographic element;
- a second beam splitter for transmitting a light beam from the first light source toward a second recording medium different from the first recording medium, while changing an optical path of reflected light from the second recording medium toward the holographic element and matching an optical axis of the changed optical path with the optical axis passing through the holographic element and the first photodetector to lead the optical axis of the optical path to the holographic element;
- a collimating lens for correcting spherical aberration of the light beam from the first light source which has passed through the second beam splitter, while directing reflected light from the second recording medium toward the second beam splitter;
- an objective lens for applying the light beam, of which the spherical aberration has been corrected by the collimating lens, to the second recording medium, while directing the reflected light from the second recording medium toward the collimating lens; and
- a second photodetector for receiving the first-order diffraction light from the holographic element to obtain a focusing error signal.

10. An optical pickup device for writing and reading signals to and from disc-shaped recording media having different recording densities comprises:

first, second, and third light sources for emitting light beams of different wavelengths, wherein, of those different wavelengths, the wavelength of the first light source is shortest and the wavelength of the third light source is longest;

a holographic element for dividing incoming light into zero-order diffraction light and first-order diffraction light;

a first photodetector for receiving the zero-order diffraction light from the holographic element to obtain an RF signal and a tracking error signal;

a first beam splitter for changing an optical path of a light beam coming from the second light source or the third light source toward a recording medium and matching an optical axis of the changed optical path with an optical axis passing through the holographic element and the first photodetector, while directing reflected light from the recording medium to the holographic element;

a second beam splitter for transmitting a light beam from the first light source toward a recording medium, while changing an optical path of reflected light from the recording medium toward the holographic element and matching an optical axis of the changed optical path with the optical axis passing through the holographic element and the first photodetector to lead the optical axis of the optical path to the holographic element;

a collimating lens for correcting spherical aberration of the light beam from the first light source which has passed through the second beam splitter, while directing reflected light from the recording medium toward the second beam splitter;

a synthesis prism for changing the optical path of the light beam of which the spherical aberration has been corrected by the collimating lens, and matching an optical axis of the changed optical path with the optical axis passing through the holographic element and the first photodetector, while splitting the reflected light from the recording medium of the light beam of the first light source to direct part of the reflected light toward the collimating lens; and a second photodetector for receiving the first-order diffraction light from the holographic element to obtain a focusing error signal.

11. An optical pickup device for writing and reading signals to and from disc-shaped recording media having different recording densities comprises:

first, second, and third light sources for emitting light beams of different wavelengths, wherein, of those different wavelengths, the wavelength of the first light source is shortest and the wavelength of the third light source is longest;

a holographic element for obtaining first-order diffraction light of incoming light; and a photodetector for receiving the first-order diffraction light from the holographic element to obtain an RF signal, a tracking error signal, and a focusing error signal, wherein the holographic element has a hologram pattern that is set with a wavelength intermediate between the wavelength of the first light source and the wavelength of the third light source; and wherein the first light source, the second light source, and the third light source are arranged in such a manner that the light sources are at increasing distances from the photodetector in order of increasing wavelength of the light sources and at increasing distances from the holographic element in a direction in which the optical axis passing through the holographic element and the second light source extend in order of decreasing wavelength of the light sources, with the first light source, the second light source, and the third light source being installed in a single package.

12. The optical pickup device according to claim 11, wherein the photodetector has a two-element light-receiving section for detecting the focusing error signal by differential operation, the first-order diffraction light from the holographic element of the light beam of each of the first light source, the second light source, and the third light source falls on the two-element light receiving section in different areas, and a parting line for the two-element light-receiving section has a length and an inclination with respect to a plane which includes the optical axis and passes through a center of the two-element light-receiving section, the length and inclination of the parting line being set in accordance with possible variations in ambient temperature so that even if the ambient temperature changes, a differential output of the two-element light-receiving section becomes "0" when the light beam from each of the first light source, the second light source, and the third light source is focused on the recording medium.

13. The optical pickup device according to claim 12, wherein the inclination of the parting line of the two-element light-receiving section is larger in a first area of the two-element light-receiving section in which the first-order diffraction light of the light beam from the first light source falls than in a second area on which the first-order diffraction light of the light beam from the third light source falls.

14. The optical pickup device according to claim 13, wherein the length of the parting line of the two-element light-receiving section is longer in the second area than in the first area.

* * * * *